(12) United States Patent
Mohan

(10) Patent No.: US 8,165,031 B2
(45) Date of Patent: Apr. 24, 2012

(54) MULTI-POINT AND ROOTED MULTI-POINT PROTECTION SWITCHING

(75) Inventor: Dinesh Mohan, Kanata (CA)

(73) Assignee: Rockstar Bidco, LP, New York, NY (US)

( * ) Notice: Subject to any disclaimer, the term of this patent is extended or adjusted under 35 U.S.C. 154(b) by 169 days.

(21) Appl. No.: 12/250,266

(22) Filed: Oct. 13, 2008

(65) Prior Publication Data
US 2009/0175176 A1  Jul. 9, 2009

Related U.S. Application Data

(60) Provisional application No. 60/979,449, filed on Oct. 12, 2007.

(51) Int. Cl.
H04J 3/14 (2006.01)
G06F 11/08 (2006.01)
H04L 12/28 (2006.01)
(52) U.S. Cl. .... 370/244; 370/217; 370/222; 370/395.53
(58) Field of Classification Search ............ 370/244, 370/395.53, 216–217, 218, 225, 242, 241.1, 370/222, 401; 709/239
See application file for complete search history.

(56) References Cited

U.S. PATENT DOCUMENTS

| | | | |
|---|---|---|---|
| 7,003,705 B1 * | 2/2006 | Yip et al. ................. | 714/717 |
| 7,032,032 B2 | 4/2006 | Loprieno | |
| 7,093,027 B1 * | 8/2006 | Shabtay et al. ............. | 709/239 |
| 7,152,115 B2 * | 12/2006 | Ould Brahim et al. ....... | 709/238 |
| 7,599,295 B2 * | 10/2009 | Dunbar et al. ............. | 370/235 |
| 7,619,966 B2 * | 11/2009 | Lee .......................... | 370/218 |
| 7,630,392 B2 * | 12/2009 | Raza ....................... | 370/432 |
| 7,647,422 B2 * | 1/2010 | Singh et al. .............. | 709/238 |
| 2004/0160895 A1 * | 8/2004 | Holmgren et al. ......... | 370/216 |
| 2005/0099955 A1 | 5/2005 | Mohan et al. | |
| 2005/0249124 A1 * | 11/2005 | Elie-Dit-Cosaque et al. | 370/242 |
| 2006/0164975 A1 * | 7/2006 | Filsfils et al. ........... | 370/225 |
| 2006/0221813 A1 * | 10/2006 | Scudder et al. ........... | 370/216 |
| 2007/0268817 A1 | 11/2007 | Smallegange et al. | |
| 2008/0159311 A1 * | 7/2008 | Martinotti et al. ........ | 370/401 |
| 2009/0034413 A1 * | 2/2009 | Sajassi et al. ............ | 370/228 |
| 2009/0073988 A1 * | 3/2009 | Ghodrat et al. .......... | 370/395.53 |

FOREIGN PATENT DOCUMENTS

| | | |
|---|---|---|
| WO | 2008/120931 A1 | 10/2008 |
| WO | 2009000327 A1 | 12/2008 |

OTHER PUBLICATIONS

International Search Report for PCT/IB2008/002708, mailed May 13, 2009.

* cited by examiner

Primary Examiner — Kwang B Yao
Assistant Examiner — Candal Elpenord
(74) Attorney, Agent, or Firm — Withrow & Terranova, PLLC

(57) ABSTRACT

The present invention relates to techniques for allowing one or more edge nodes in a backbone network to quickly and efficiently switch traffic delivery from a first virtual network to a second virtual network in response to a failure occurring in association with the first virtual network. In certain embodiments, an edge node is capable of independently detecting that a failure has occurred on the first virtual network and quickly transitioning from the first virtual network to the second virtual network for receiving or delivering traffic. Upon detecting the failure in the first virtual network, the edge node will begin delivering traffic over the second virtual network. If control messages are not already being provided over the second network, the edge node may begin providing the control messages over the second virtual network.

27 Claims, 16 Drawing Sheets

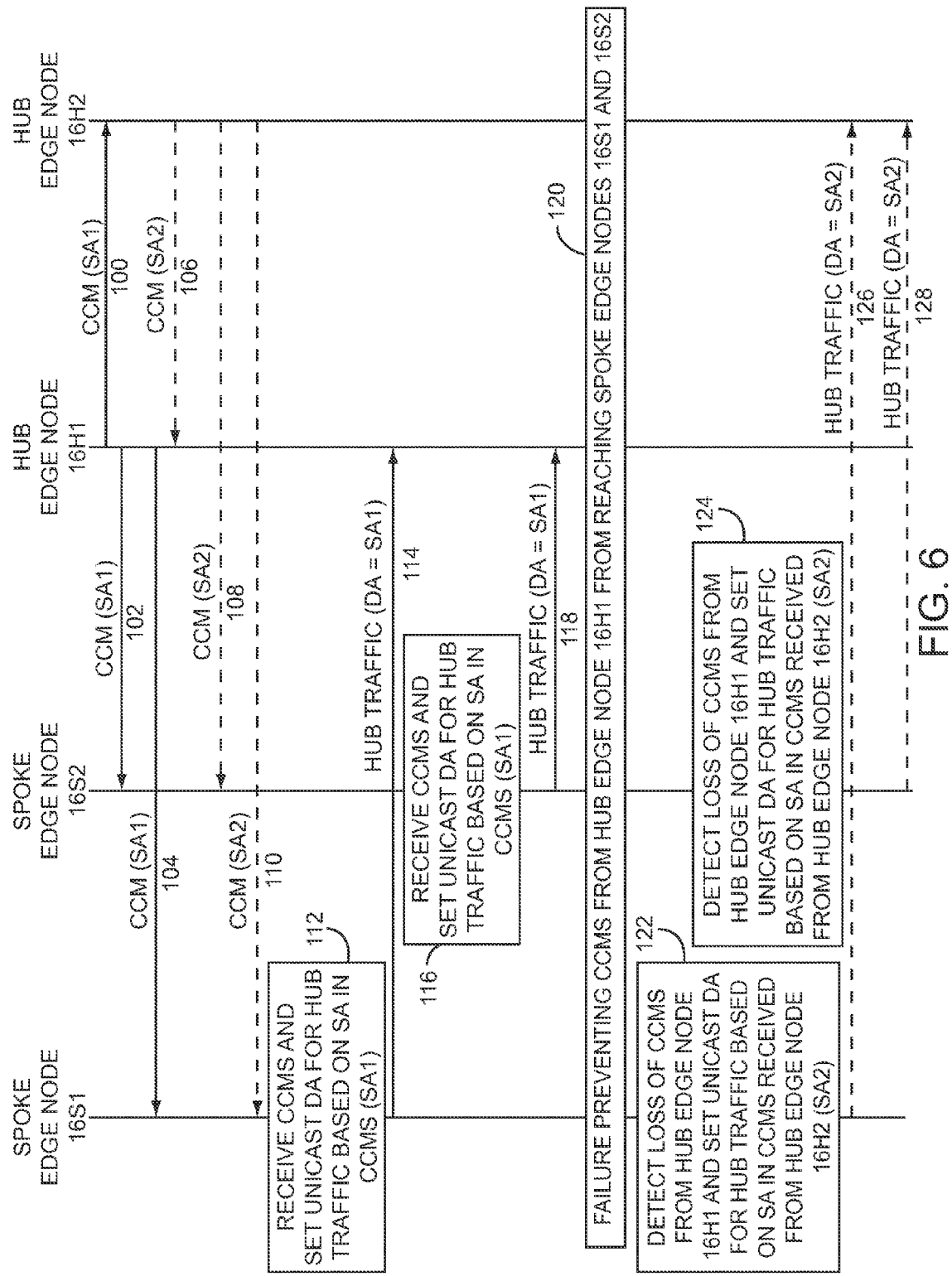

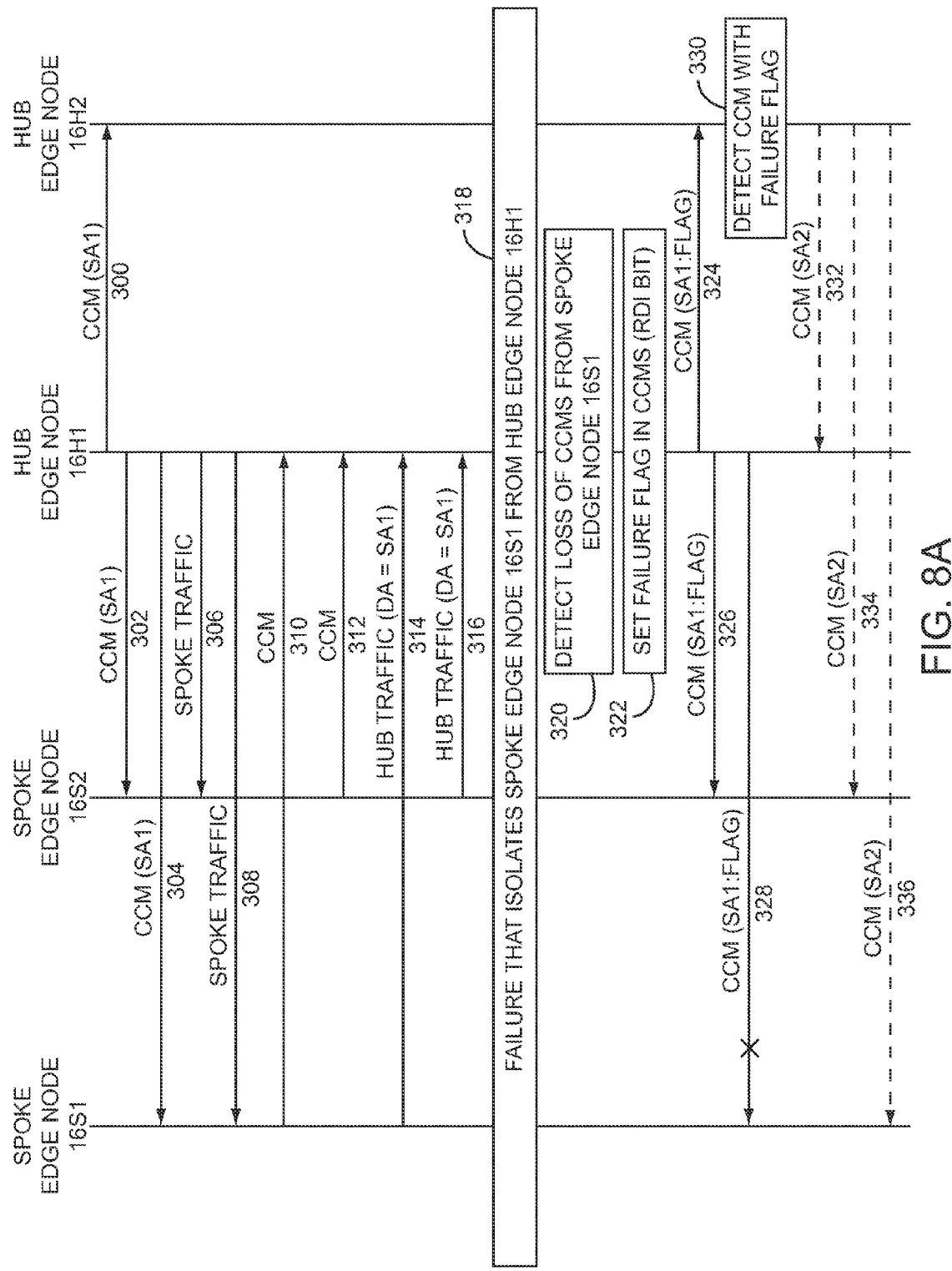

MULTI-POINT AND ROOTED MULTI-POINT PROTECTION SWITCHING

This application claims the benefit of U.S. provisional patent application Ser. No. 60/979,449 filed Oct. 12, 2007, the disclosure of which is incorporated herein by reference in its entirety.

FIELD OF THE INVENTION

The present invention relates to communications, and in particular to providing a substantially immediate recovery mechanism for Carrier Ethernet and like network deployments.

BACKGROUND OF THE INVENTION

Carrier Ethernet refers to the use of Ethernet frames as a transport mechanism within a backbone network, which connects any number of edge networks, such as enterprise networks, local area networks, subscriber networks, residences, and the like. The backbone networks are generally used to support wide area or metropolitan area networking between these edge networks. The rationale for using Ethernet within backbone networks is plentiful. Most local area networks (LANs), networking devices, and networked user terminals in the edge networks rely on Ethernet as a transport mechanism, which generally refers to a defined data link layer technology. As such, the use of Ethernet in the edge networks is ubiquitous and data within these edge networks is carried in Ethernet frames. By also using Ethernet frames in the backbone networks that connect the edge networks, the frames in edge and backbone networks are compatible with each other and frame conversion is avoided. If the backbone network does not employ Ethernet, the frames must be converted from one transport mechanism to another each time a boundary between an edge and backbone networks is crossed. Carrier Ethernet also supports high network access speeds, as the Ethernet-based edge networks can be coupled directly to the backbone network with relative ease. Finally, the cost associated with Ethernet-based networks is relatively low given the mature, widespread, and large scale use of Ethernet equipment. For these reasons, there is a strong desire to employ Carrier Ethernet in backbone networks that support all types of communications, including data, voice, audio, and video.

Unfortunately, Carrier Ethernet does not provide substantially immediate recovery mechanisms when a networking device or link fails. Current recovery mechanisms include rerouting and other restoration techniques, which require the affected nodes to communicate with each other extensively to identify the failure and then either reroute traffic or attempt to correct the failure. The need for the nodes to communicate with each other to such a degree to identify and address the failure injects significant delay in the recovery mechanism. Delivery sensitive services that require high quality of service levels like telephony and television services are subject to unacceptably long dropouts when substantially immediate recovery mechanisms are not available. Currently, existing recovery mechanisms being employed for Carrier Ethernet take more than a few seconds and often 30 seconds or more to recover from a failure. In contrast, most telephony and television service providers require a recovery period of less than 50 milliseconds to ensure a customer is unaffected by a failure. Other types of transport technologies, such as traditional Synchronous Optical Network (SONET) infrastructures have built-in recovery mechanisms that are capable of recovering from a failure in less than 50 milliseconds; however, these technologies are generally much more costly than Carrier Ethernet and require undesirable interworking at network entry and exit. The absence of an acceptable recovery mechanism for Carrier Ethernet is posing a major barrier to employing Carrier Ethernet for a wider and more comprehensive range of services. As such, there is a need for an effective and efficient recovery mechanism for backbone networks that employ Carrier Ethernet and like transport mechanisms.

SUMMARY OF THE INVENTION

The present invention relates to techniques for allowing one or more edge nodes in a backbone network to quickly and efficiently switch traffic delivery from a first virtual network to a second virtual network in response to a failure occurring in association with the first virtual network. In certain embodiments, an edge node is capable of independently detecting that a failure has occurred on the first virtual network and quickly transitioning from the first virtual network to the second virtual network for receiving or delivering traffic. Failures associated with the first virtual network may be detected in a variety of ways, including detecting the loss of control messages that are continuously being provided by another edge node via the first virtual network; detecting commencement of the delivery of control messages over the second virtual network by another edge node; receiving control messages that include a failure indicator over the first virtual network, and the like. Upon detecting the failure in the first virtual network, the edge node will begin delivering traffic over the second virtual network. If control messages are not already being provided over the second network, the edge node may begin providing the control messages over the second virtual network.

A source address provided in the control messages may be used by an edge node that is receiving the control messages as the destination address for traffic being sent over the backbone network. However, the delivery and processing of control messages will vary from one embodiment another. When control messages are used, they are sent successively by a given edge node at a rate that is substantially higher than one control message every 50 milliseconds, and preferably at a rate of higher than about one control message every ten milliseconds. As these rates, failure detection procedures being employed by a given edge node will allow the edge node to quickly detect the loss or presence of control messages or failure indicators and react with sufficient speed to allow the edge node to switch from delivering traffic on the first virtual network to delivering traffic on the second virtual network in less than 50 milliseconds. With protective switching occurring in less than 50 milliseconds, time-sensitive services are not unacceptably interrupted.

In one embodiment, the first virtual network and the second virtual network are Ethernet virtual connections that connect a common group of edge nodes, and the backbone network transports traffic using a Carrier Ethernet architecture; however, other architectures may take advantage of the concepts of the present invention. The first and second virtual networks and the associated edge nodes may be configured in a multi-point or rooted multi-point configuration. In a multi-point configuration, any edge node may communicate with any other edge node. Preferably, each edge node in the multi-point configuration is associated with each of the first and second virtual networks. In a rooted multi-point configuration, a hub edge node is capable of communicating with multiple spoke edge nodes; however, the spoke edge nodes may only communicate with the hub edge nodes and are not allowed to communicate with each other. As such, each of the first and second virtual networks will have different hub edge nodes, each of which serves the same set of spoke edge nodes over the respective virtual networks.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 6 is a communication flow illustrating a first embodiment of the present invention.

FIGS. 8A and 8B are a communication flow illustrating a third embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Prior to delving into the details of the present invention, an overview of a Carrier Ethernet environment is provided. Although Carrier Ethernet is used to illustrate the concepts of the present invention, these concepts are applicable to other transport mechanisms, such as Multi-Protocol Label Switching (MPLS), which support multi-point and rooted multi-point services, which will be defined and illustrated further below. For additional information relating to Carrier Ethernet, reference is made to the IEEE 802.1ag and 802.1ah set of standards as well as the technical specifications MEF 1 through 21 of the Metro Ethernet Forum, which are incorporated herein by reference.

Figure 1:
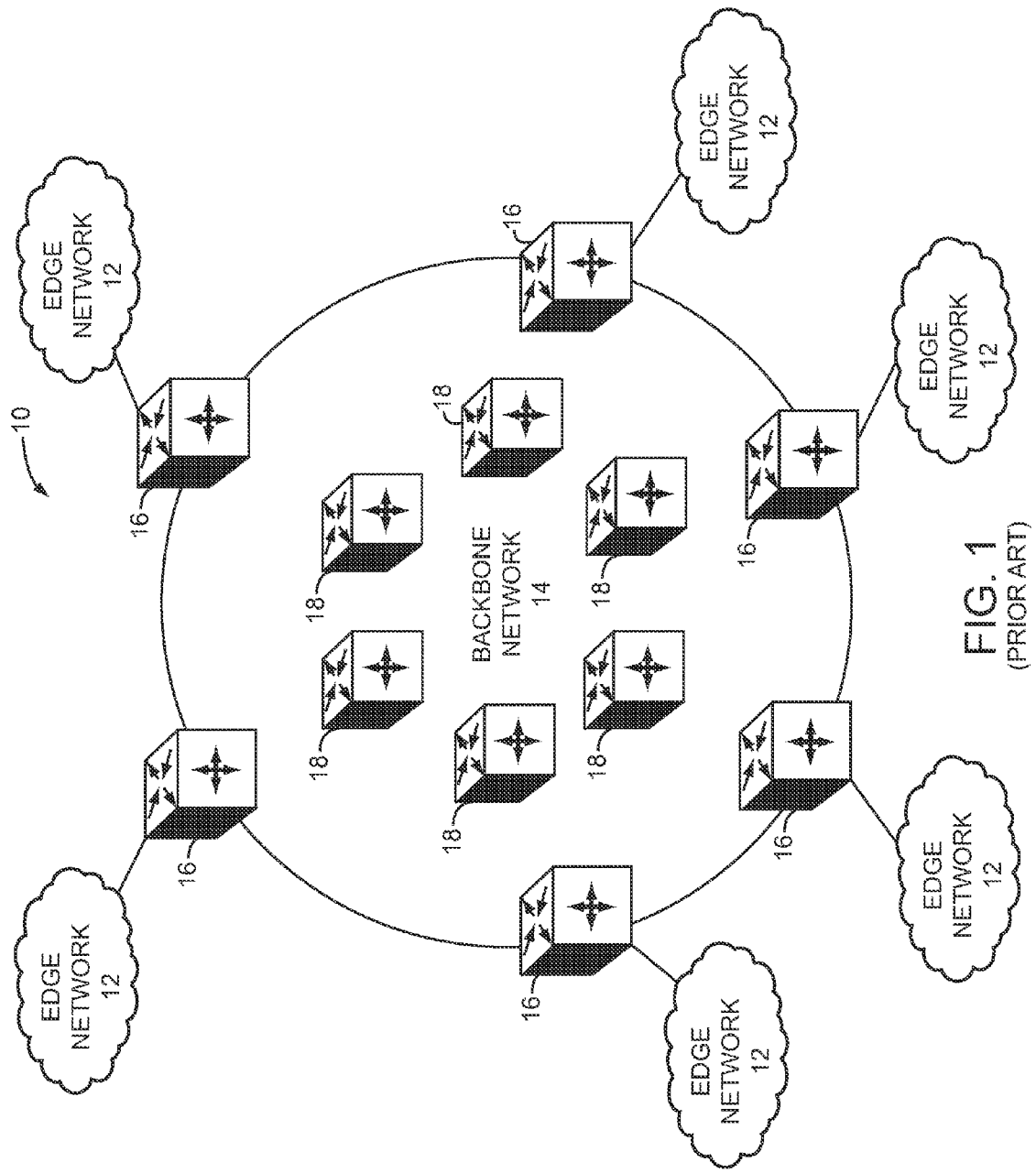
FIG. 1 is a block diagram of a communication environment according to one embodiment of the present invention.

An exemplary Carrier Ethernet environment 10 is illustrated in FIG. 1 and includes a number of edge networks 12 that are interconnected by a backbone network 14. The backbone network 14 employs Carrier Ethernet as a transport mechanism, and the edge networks 12 may employ traditional Ethernet as a transport mechanism; however, other transport mechanisms may be used in the edge networks 12 and interworked with the backbone network 14. The points at the edges of the backbone network 14 may be referred to as edge nodes 16 and provide the necessary interworking and connectivity between the backbone network 14 and the edge networks 12. An exemplary edge node 16 may include an Ethernet bridge, a backbone edge bridge, an Ethernet routing switch, and the like. Intermediate nodes 18 provide the connectivity from one edge of the backbone network 14 to another, and as such intermediate nodes 18 may be connected to each other as well as one or more edge nodes 16. Further, edge nodes 16 may be directly connected to each other in addition to being indirectly connected to each other via one or more intermediate nodes 18.

Assuming the edge networks 12 use an Ethernet transport mechanism, basic Ethernet frames entering the backbone network 14 from the edge networks 12 are further encapsulated into Carrier Ethernet frames by the edge nodes 16 for transport over the backbone network 14 to a destination edge node 16. The basic Ethernet frames are extracted from the Carrier Ethernet frames by the destination edge node 16 and delivered over the edge network 12 in traditional Ethernet fashion to their intended destination or destinations.

Within the backbone network 14, an Ethernet Virtual Connection (EVC) is used to virtually connect and associate any two or more points at the edges of the backbone network 14. In this discussion, an EVC is constructed from a Service Instance Identifier (ISID) operating over a Backbone Virtual Local Area Network (B-VLAN) per the IEEE 802.1 ah standard, which is incorporated herein by reference in its entirety, although other constructions are possible. Each EVC effectively provides a virtual network for the associated points and is isolated from other EVCs. An EVC may connect and associate two or more edge nodes 16 directly or through any number of intermediate nodes 18. The edge nodes 16 associated with an EVC may transfer Ethernet frames to one another over the EVC while the EVC prevents the transfer of Ethernet frames to or from edge nodes 16 or intermediate nodes 18 that are not associated with the EVC. The Metro Ethernet Forum defines three types of EVCs: an E-LINE, an E-LAN, and an E-TREE. An E-LINE provides a single point-to-point connection between any two edge nodes 16 and may be used to support services such as Voice over Internet Protocol (VoIP) and Internet Access. E-LAN provides multi-point connectivity between more than two edge nodes 16 and may be used to support services such as audio and video conferencing, IPTV, On-demand media, and the like. E-TREE provides rooted multi-point connectivity between a hub edge node 16 and two or more spoke edge nodes 16 through any number of intermediate nodes 18. The hub edge nodes 16 are allowed to multicast or broadcast information to each of its associated spoke edge nodes 16, yet the spoke edge nodes 16 are only allowed to communicate with the associated hub edge nodes 16. The spoke edge nodes 16 are not allowed to communicate with each other. Notably, the hub edge nodes 16 may be allowed to communicate with each other. E-TREE may be used to support broadcast television and radio services among others.

Figure 2:
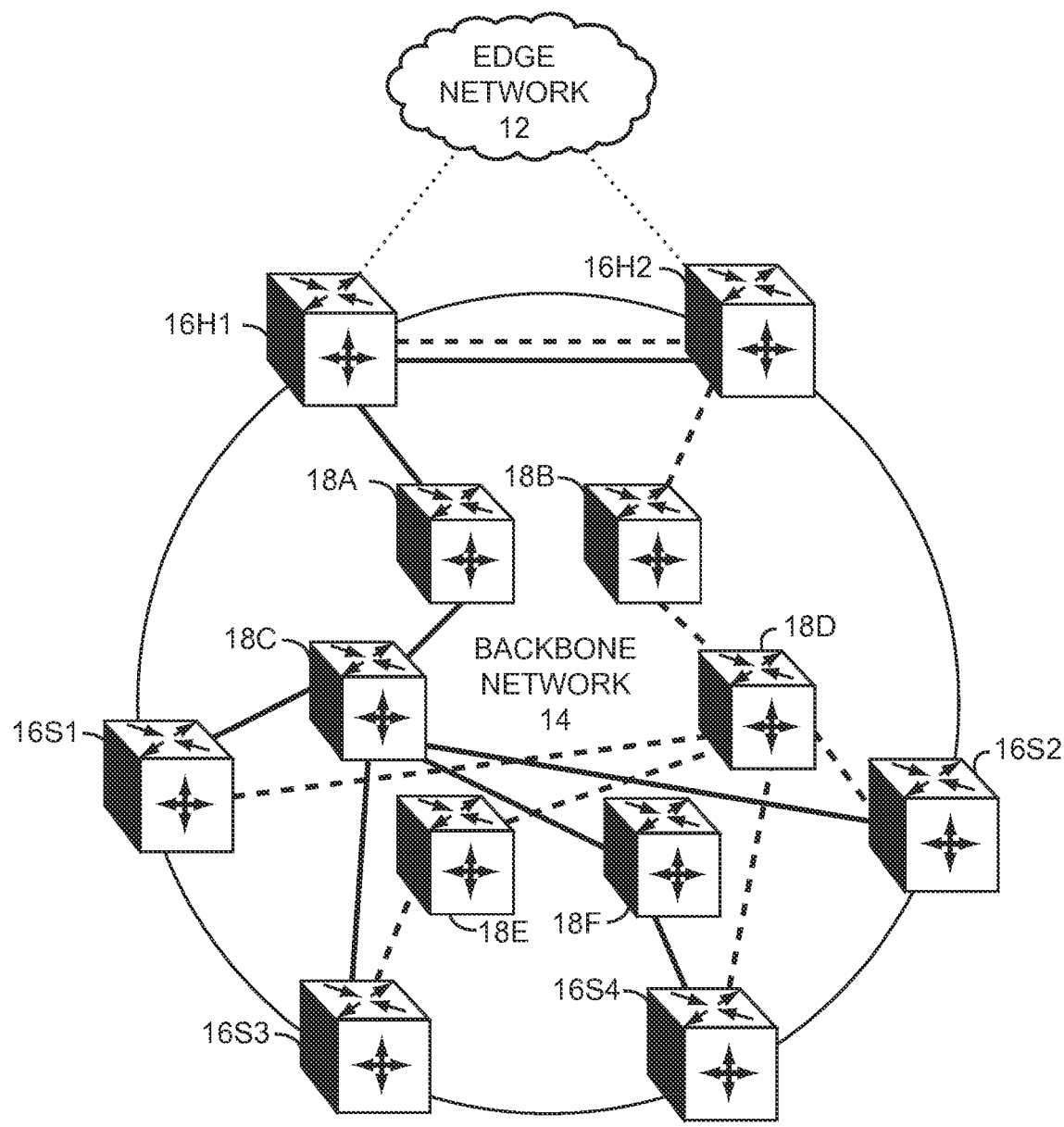
FIG. 2 illustrates a rooted multi-point architecture for a backbone network according to one embodiment of the present invention.

With reference to FIG. 2, a backbone network 14 includes a primary tree and a secondary tree, according to one embodiment of the present invention. The primary tree is preferably an EVC in the form of an E-TREE, which generally extends between a first hub edge node 16H1 and the spoke edge nodes 16S1, 16S2, 16S3, and 16S4. The primary tree is represented by the thick, solid line that extends from the first hub edge node 16H1 and branches out to each of the spoke edge nodes 16S1, 16S2, 16S3, and 16S4 via the intermediate nodes 18A, 18C, and 18F. The primary tree also includes a branch connected to a second hub edge node 16H2. Similarly, the secondary tree is preferably an EVC in the form of an E-TREE, which generally extends between a second hub edge node 16H2 and the spoke edge nodes 16S1, 16S2, 16S3, and 16S4. The secondary tree is represented by the thick, dashed line that extends from hub edge node 16H2 and branches out to each of the spoke edge nodes 16S1, 16S2, 16S3, and 16S4 via the intermediate nodes 18B, 18D, and 18E. The secondary tree also includes a branch connected to first hub edge node 16H1. As such, the primary and second trees serve the same spoke edge nodes 16S1, 16S2, 16S3, and 16S4 from the different first and second hub edge nodes 16H1 and 16H2.

The first and second hub edge nodes 16H1 and 16H2 are coupled to the same edge network 12 and are capable of receiving traffic from a given source and delivering the traffic over the respective primary and secondary trees to the one or more of the spoke edge nodes 16S1, 16S2, 16S3, and 16S4. Further, any spoke edge nodes 16S1, 16S2, 16S3, and 16S4 are capable of delivering traffic over the respective primary and secondary trees to the first and second hub edge nodes 16H1 and 16H2. In addition to delivering traffic, the nodes associated with the primary or secondary trees may exchange control messages over the trees, such as Continuity Check Messages (CCMs), which may be used to determine whether a failure has occurred within the primary and secondary trees. In this embodiment, control messages and traffic being sent to the hub edge nodes 16H1 and 16H2 from a spoke edge node 16S1, 16S2, 16S3, 16S4 is delivered using an ISID, which is referred to as a spoke ISID. Control messages and traffic being sent to the spoke edge nodes 16S1, 16S2, 16S3, 16S4 from a hub edge node 16H1, 6H2 is delivered using a second ISID, which is referred to as a hub ISID and is different than the spoke ISID. The Ethernet frames carrying the control messages or traffic will have source and destination addresses associated with the edge nodes 16 and will be tagged according to the tree, primary or secondary, being used for transport.

The primary and secondary trees may be established dynamically or statically through manual provisioning or an appropriate control protocol, such as some version of Spanning Tree Protocol (xSTP) or Provider Link State Bridging (PLSB). When established, steps may be taken to ensure that the primary and secondary trees are not part of a shared risk link group (SRLG), and as such, a single link or nodal failure will not affect both the primary and secondary trees. The goal is to ensure that a path exists between at least one of the hub edge nodes 16H1, 16H2 and each the spoke edge nodes 16S1, 16S2, 16S3, 16S4 over either the primary tree or the secondary tree, even when there is a failure of a link or node in the backbone network 14. When configured in this manner, the primary and secondary trees are considered independent, even though they serve common spoke edge nodes 16S1, 16S2, 16S3, and 16S4 from different hub edge nodes 16H1 and 16H2.

Figure 3:
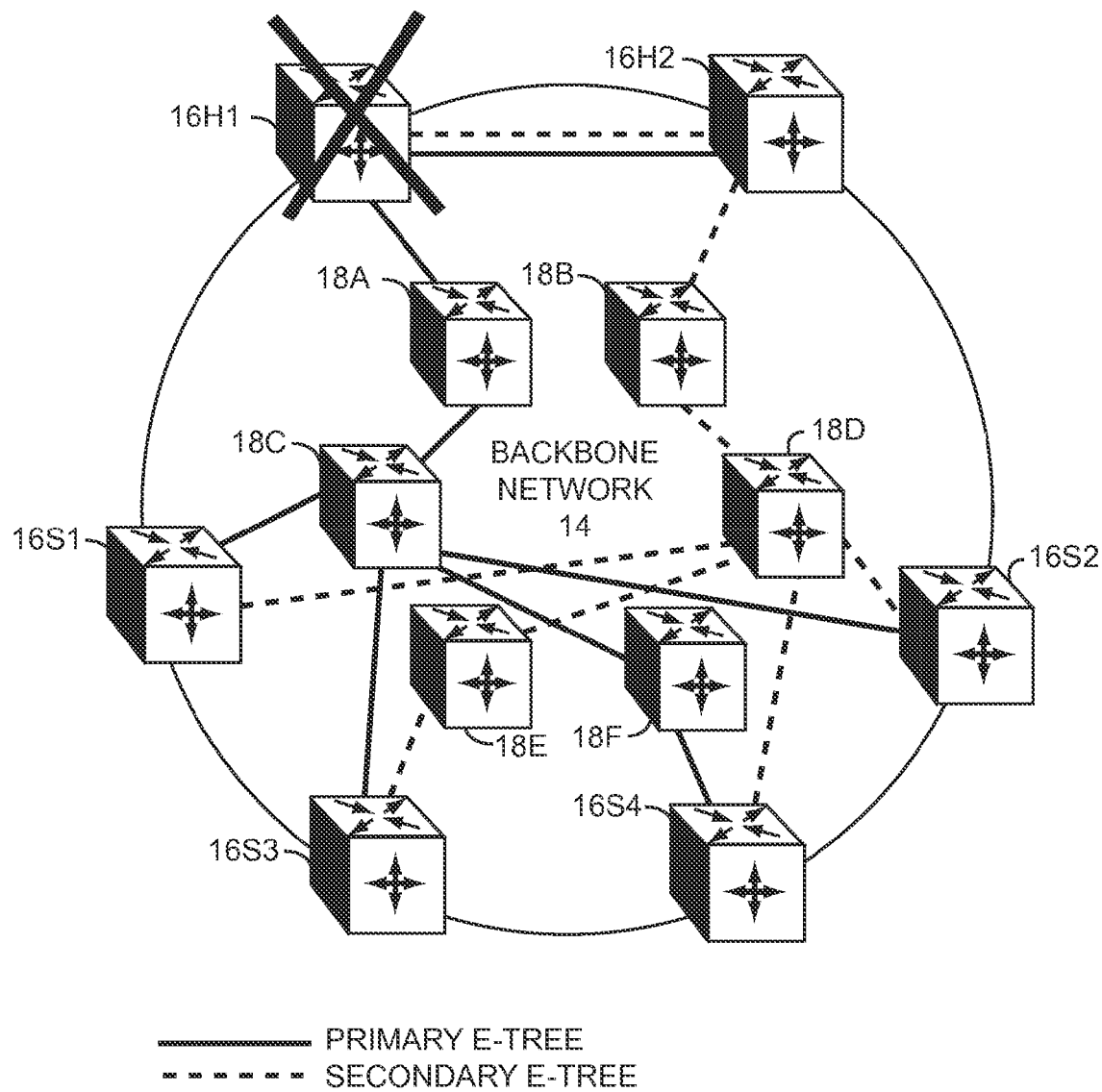
FIG. 3 illustrates the failure of a hub edge node in a rooted multi-point architecture.
Figure 4:
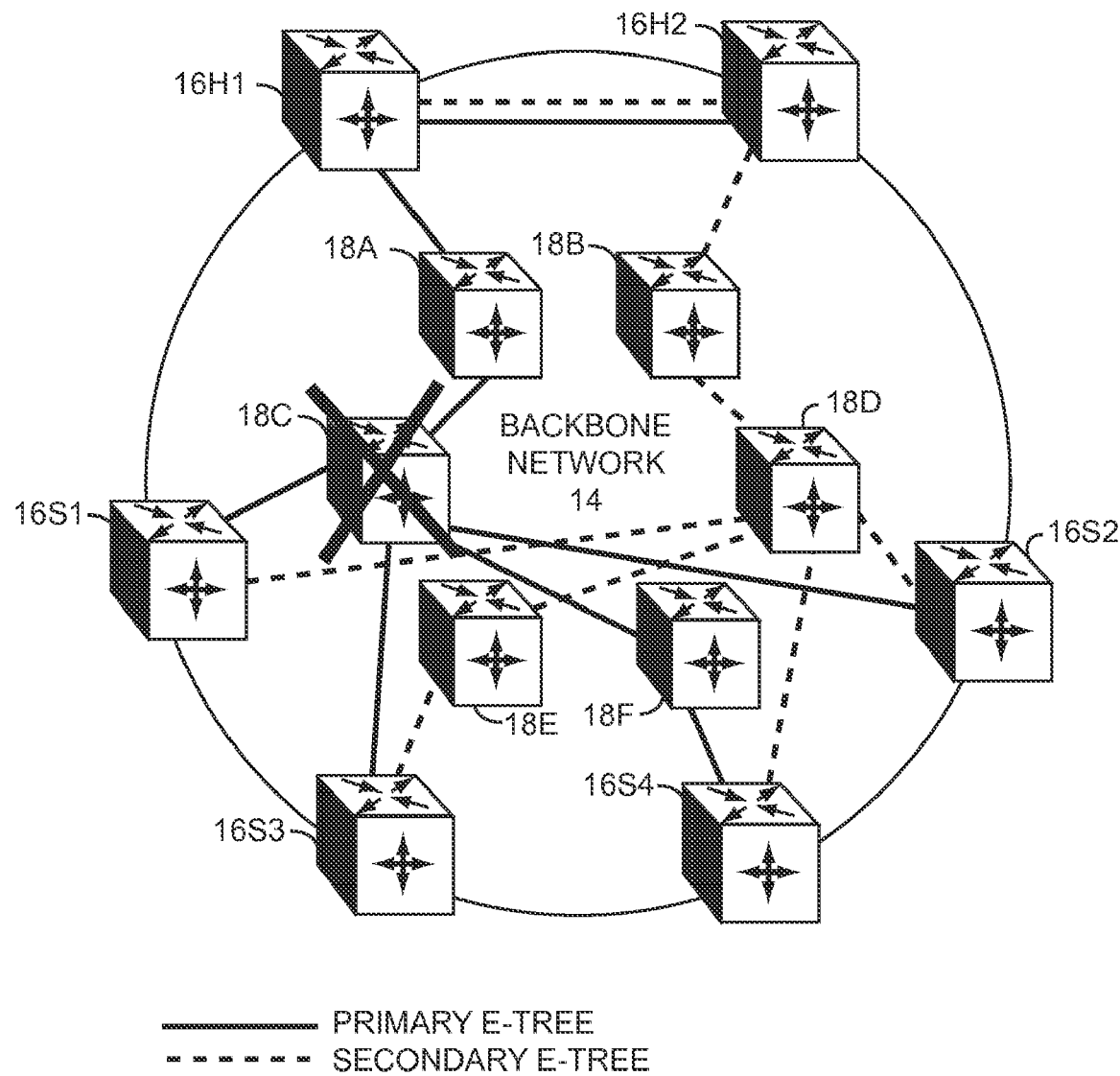
FIG. 4 illustrates the failure of an intermediate node in a rooted multi-point architecture.
Figure 5:
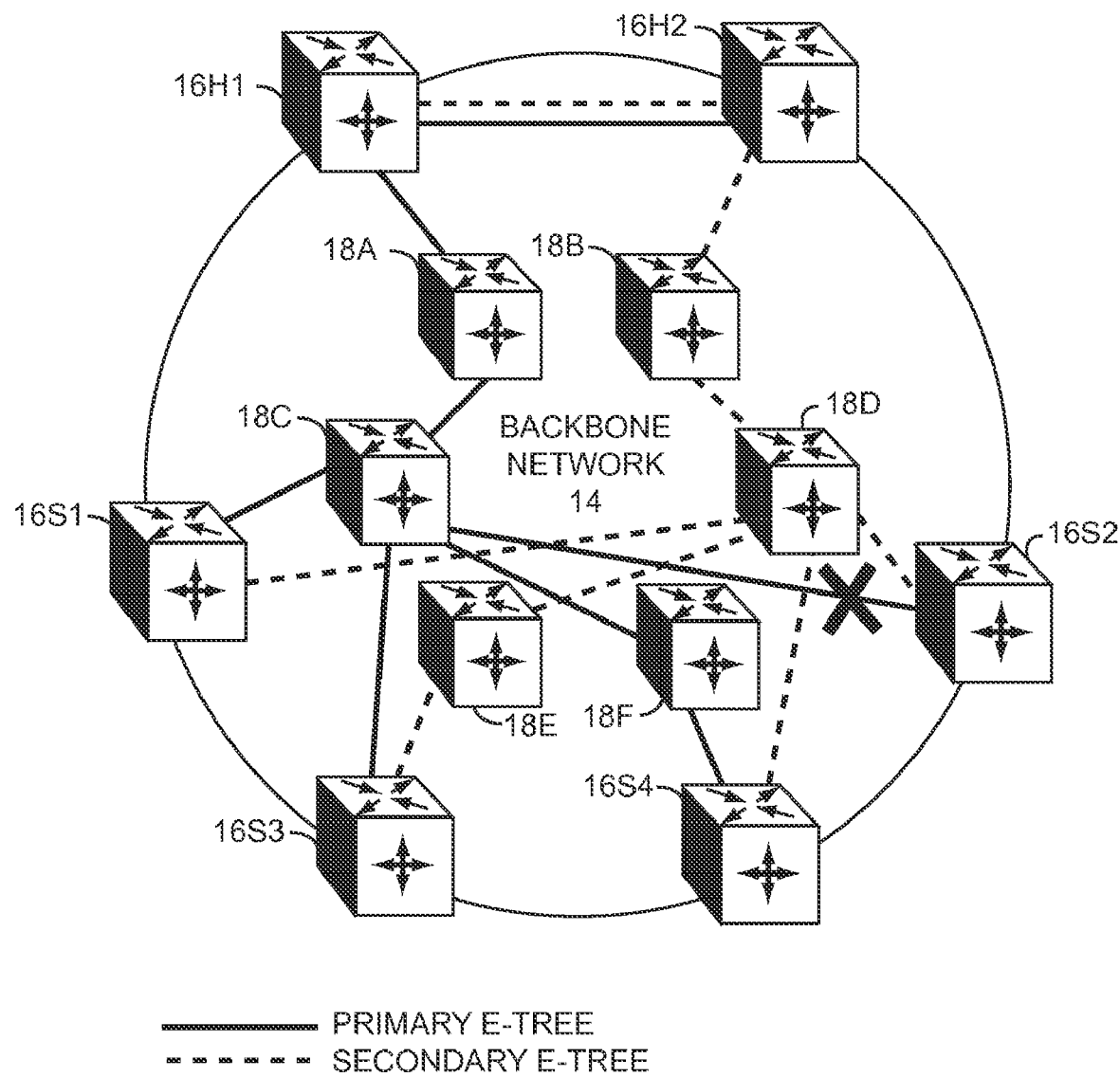
FIG. 5 illustrates the failure of a link in a rooted multi-point architecture.

FIGS. 3, 4, and 5 illustrate different types of failures that can occur in the backbone network 14 and affect a primary or secondary tree. Each of the three different failures that are illustrated affect the primary tree and do not affect the secondary tree. As such, these failures will prevent the exchange of traffic and control messaging between the first hub edge node 16H1 and one or more of the spoke edge nodes 16S1, 16S2, 16S3, 16S4. With reference to FIG. 3, the first hub edge node 16H1 fails, and as such, the first hub edge node 16H1 is not available for receiving or delivering control messages to the spoke edge nodes 16S1, 16S2, 16S3, 16S4, or to the second hub edge node 16H2. Further, the first hub edge node 16H1 will not be able to exchange traffic between the associated edge network 12 (not shown) and the backbone network 14, along with the other nodes of the backbone network 14. Even though the first hub edge node 16H1 has failed, traffic and control messaging may be exchanged between the second hub edge node 16H2 and the spoke edge nodes 16S1, 16S2, 16S3, 16S4 over the secondary tree. As will be described further below, upon detecting such a failure the present invention provides techniques for quickly switching over to the secondary tree from the primary tree when such a failure occurs, according to one embodiment of the present invention.

With reference to FIG. 4, assume intermediate node 18C fails. As illustrated, intermediate node 18C is a critical node in the primary tree, and when it fails, traffic and control messaging cannot be exchanged between the first hub edge node 16H1 and the spoke edge nodes 16S1, 16S2, 16S3, 16S4 over the primary tree. However, traffic and control messaging may be exchanged between the second hub edge node 16H2 and the spoke edge nodes 16S1, 16S2, 16S3, 16S4 over the secondary tree.

With reference to FIG. 5, a link failure is illustrated. The illustrated link failure involves the physical link between intermediate node 18C and the spoke edge node 16S2. With such a failure, traffic and control messaging cannot be exchanged between the first hub edge node 16H1 and the second spoke edge node 16S2 using the primary tree. However, traffic and control messaging may be exchanged between the first hub edge node 16H1 and the first, third, and fourth spoke edge nodes 16S1, 16S3, 16S4 using the primary tree. Using the secondary tree, traffic and control messaging may be exchanged between the second hub edge node 16H2 and the second spoke edge node 16S2, as well as the first, third, and fourth spoke edge nodes 16S1, 16S3, 16S4. In each of these examples, since the first and second hub edge nodes 16H1 and 16H2 handle the same traffic for the same spoke edge nodes 16S1, 16S2, 16S3, 16S4, a failure associated with one tree can be compensated for by employing another tree. Although the examples provided herein only illustrate two hub edge nodes 16H1 and 16H2 cooperating with a given subset of spoke edge nodes 16S1, 16S2, 16S3, and 16S4, any number of hub edge nodes 16 may be associated with such a subset.

In the following examples, these different types of failures may be handled in different ways using different protection mechanisms. With a first embodiment, failure protection is provided for an E-TREE configuration with primary and secondary trees configured as described above. In this embodiment, assume that traffic is simultaneously broadcast or unicast from both of the first and second hub edge nodes 16H1 and 16H2 over the primary and secondary trees to the appropriate spoke edge nodes 16S1, 16S2, 16S3, 16S4. Notably, in the following communication flows, only spoke edge nodes 16S1 and 16S2 are illustrated for conciseness and clarity. These spoke edge nodes 16S1 and 16S2 will only deliver traffic, preferably in a unicast form, to one of the hub edge nodes 16H1 and 16H2 over a selected one of the primary and secondary trees. Accordingly, a given spoke edge node 16S1, 16S2 will only transmit traffic over one tree at a time. The primary tree may be identified or selected through an appropriate provisioning process. Again, the first hub edge node 16H1 is associated with the primary tree and the second hub edge node 16H2 is associated with the secondary tree. In this embodiment, the spoke edge nodes 16S1 and 16S2 will select an appropriate one of the primary and secondary trees to use at any given time. When there is no failure associated with the primary tree, the primary tree will be used. When a failure is detected on the primary tree, the spoke edge nodes 16S1, 16S2 will independently switch to using the secondary tree for delivery of traffic to the second hub edge node 16H2 instead of delivering traffic to the first hub edge node 16H1 over the primary tree.

Failures are detected by monitoring control messages, such as CCMs, which are sent to each of the spoke edge nodes 16S1, 16S2 by both of the hub edge nodes 16H1, 16H2. The first hub edge node 16H1 will send its CCMs to the first and second spoke edge nodes 16S1, 16S2 over the primary tree, while the second hub edge node 16H2 will send the CCMs to the first and second spoke edge nodes 16S1, 16S2 over the secondary tree. To ensure switching can take place in less than 50 ms, the first and second hub edge nodes 16H1 and 16H2 will send the CCMs at a rate equal or greater to one every 10 ms.

The CCMs will have a source address (SA) and a destination address (DA). The source address will correspond to the first or second hub edge node 16H1, 16H2 from which the CCM was originated. The spoke edge nodes 16S1, 16S2 will receive the CCMs from the different hub edge nodes 16H1, 16H2 over the different trees. Assuming CCMs are being received over the selected or primary tree, the spoke edge node 16S1, 16S2 will continue to use the primary tree for delivering traffic to the first edge node 16H1. The destination address for the Ethernet frames carrying the traffic is preferably set to the source address, which was provided in the CCMs received over the primary tree. When a spoke edge node 16S1, 16S2 stops receiving CCMs from the first hub edge node 16H1, the spoke edge node 16S1, 16S2 will detect a failure on the primary tree and switch over to the secondary tree. This switching will entail changing the destination address for the Ethernet frames carrying the traffic to an address associated with the second hub edge node 16H2. This address is preferably obtained from the CCMs that are received from the second hub edge node 16H2 over the secondary tree. To complete the switch to the secondary tree, the spoke edge node 16S1, 16S2 will tag the Ethernet frames that are carrying traffic to the second hub edge node 16H2 with a tag corresponding to the secondary tree and deliver the traffic toward the second hub edge node 16H2 via the secondary tree. Notably, the traffic that was originally being sent to the first hub edge node 16H1 before the failure occurred was tagged with a tag associated with the primary tree.

Since the spoke edge nodes 16S1, 16S2 can independently and quickly detect a failure on a primary or selected tree, a switch from the primary tree to the secondary tree may occur well within 50 ms to avoid unacceptable service interruptions. Further, when CCMs begin to arrive over the primary tree from the first hub edge node 16H1, the spoke edge nodes 16S1, 16S2 may determine that the failure has been resolved, and effect a switch from the secondary tree back to the primary tree, wherein the Ethernet frames are sent to the first hub edge node 16H1 using an address associated with the first hub edge node 16H1 and tagged to identify the primary tree. Again, the address for the first hub edge node 16H1 may be derived from the CCMs provided by the first hub edge node 16H1. This is just one example of a possible reversion policy; other policies are possible, such as holding the current state for a certain period of time before reverting or requiring manual reversion commands or instructions.

With reference to FIG. 6, a communication flow is provided to illustrate the switchover process outlined above. Initially, assume the first hub edge node 16H1 is delivering CCMs to the hub edge node 16H2, the first spoke edge node 16S1, and the second spoke edge node 16S2 every 10 ms over the primary tree (steps 100, 102, and 104). The source address (SA1) for the first hub edge node 16H1 is included in the CCMs. The second hub edge node 16H2 is delivering CCMs every 10 ms to the first hub edge node 16H1, the first spoke edge node 16S1, and the second spoke edge node 16S2 over the secondary tree (steps 106, 108, and 110). The CCMs will have a source address (SA2) corresponding to the address of the second hub edge node 16H2. The first spoke edge node 16S1 will receive the CCMs from the first hub edge node 16H1 over the primary tree, and will set the unicast destination address (DA) for the hub traffic based on the source address (SA1) provided in the CCMs (step 112). The hub traffic is then sent to the first hub edge node 16H1 using the address (SA1) that is associated with the first hub edge node 16H1 (step 114). Various mechanisms such as configuration or dynamic selection could be used to assign spokes to the primary.

The second spoke edge node 16S2 will receive the CCMs from the first hub edge node 16H1 over the primary tree, and will set the unicast destination address (DA) for the hub traffic based on the source address (SA1) provided in the CCMs (step 116). The hub traffic is then sent to the first hub edge node 16H1 using the address (SA1) that is associated with the first hub edge node 16H1 (step 118). Again, the traffic will be delivered in Ethernet frames and will be tagged based on the primary or secondary tree over which the traffic is delivered.

At this point, assume there is a failure preventing the CCMs from the first hub edge node 16H1 from reaching the first and second spoke edge nodes 16S1, 16S2 (step 120). When the failure occurs, the CCMs provided by the first hub edge node 16H1 over the primary tree will not be received by the first and second spoke edge nodes 16S1, 16S2. As such, each of the first and second spoke edge nodes 16S1, 16S2 will detect a loss of CCMs from the first hub edge node 16H1 and will set the unicast destination address for the hub traffic based on the source address in the CCMs received from the second hub edge node 16H2 via the secondary tree (steps 122 and 124). The source address in the CCMs received from the second hub edge node 16H2 is SA2. Accordingly, the first and second spoke edge nodes 16S1, 16S2 will substantially immediately begin sending hub traffic over the secondary tree to the second hub edge node 16H2 using the address (SA2) of the second hub edge node 16H2 (steps 126 and 128). Again, the Ethernet frames being transported over the various trees may be tagged accordingly, such that the Ethernet frames will be delivered over the appropriate tree. Further, when the first and second spoke edge nodes 16S1, 16S2 begin receiving CCMs via the primary tree from the first hub edge node 16H1, they may switch back to using the primary tree for delivering traffic to the first hub edge node 16H1.

In a second embodiment, a recovery mechanism is provided wherein only one of the primary or secondary trees is primarily used at any given time. Preferably, the secondary tree is only used when there is a failure associated with the primary tree. Accordingly, assuming the first hub edge node 16H1 is the active node when there is no failure associated with the primary tree, the first hub edge node 16H1 will transmit CCMs over the primary tree; however, the inactive or second hub edge node 16H2 will not transmit CCMs over the secondary tree until it detects a failure on the primary tree. In this example, the second hub edge node 16H2 will detect a failure on the primary tree when it stops receiving CCMs from the first hub edge node 16H1 via the primary tree. The first and second spoke edge nodes 16S1, 16S2 will only receive CCMs from the first hub edge node 16H1 over the primary tree until there is a failure, and after the failure, the first and second spoke edge nodes 16S1, 16S2 may begin receiving CCMs from the second hub edge node 16H2 over the secondary tree.

The first and second spoke edge nodes 16S1, 16S2 will select a tree and determine the hub edge node 16H1 or 16H2 to use for delivering traffic based on receiving the CCMs. When CCMs are received from the first hub edge node 16H1, traffic will be sent to the first hub edge node 16H1 over the primary tree. When CCMs are being received from the second hub edge node 16H2 over the secondary tree, the first and second spoke edge nodes 16S1, 16S2 will send traffic to the second hub edge node 16H2 over the secondary tree. Accordingly, the first and second spoke edge nodes 16S1, 16S2 are operating substantially independently, and are determining how to transmit traffic based on the CCMs being received. Similarly, the first and second hub edge nodes 16H1 and 16H2 are also operating independently based on the delivery of CCMs. When the CCMs are being delivered at a rate substantially higher than one CCM every 50 ms, traffic delivery can be switched from the primary tree to the secondary tree within 50 ms and avoid unacceptable service disruptions.

Figure 7A:
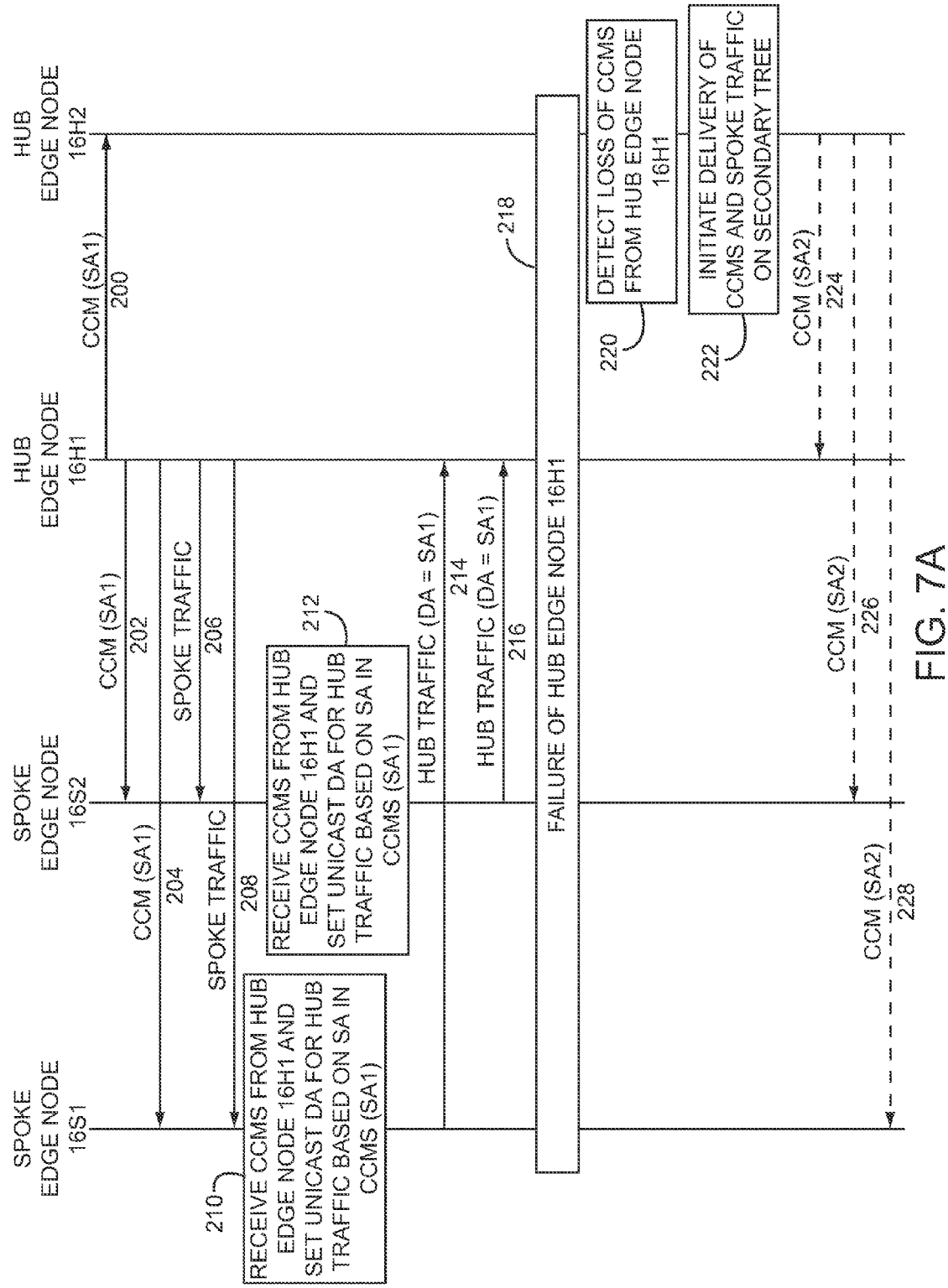
FIGS. 7A and 7B are a communication flow illustrating a second embodiment of the present invention.
Figure 7B:
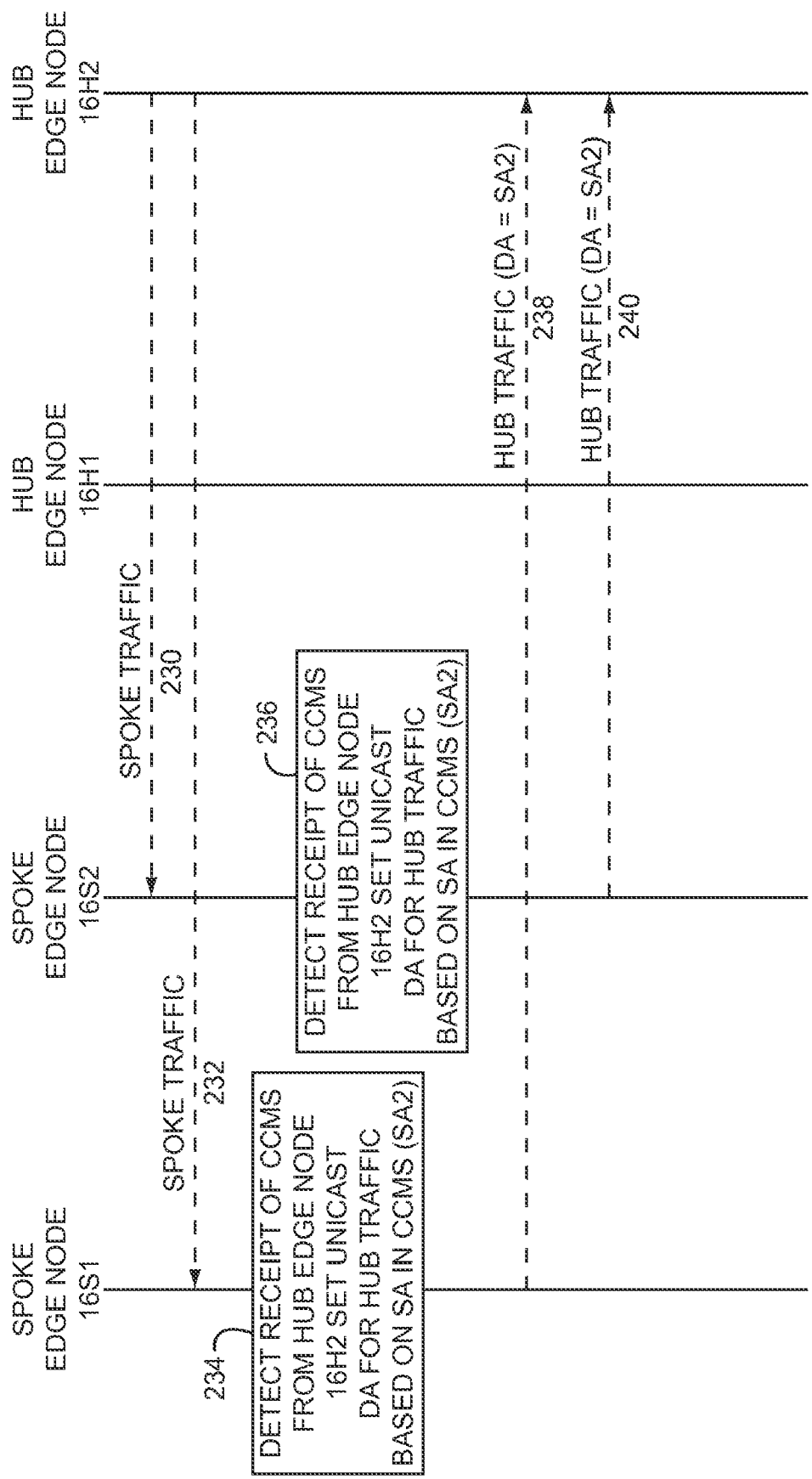

A communication flow illustrating this embodiment is provided in FIGS. 7A and 7B. Initially, the first hub edge node 16H1 will send CCMs over the primary tree to the second hub edge node 16H2 and the first and second spoke edge nodes 16S1, 16S2 (steps 200, 202, and 204). The CCMs will include the address of the first hub edge node 16H1 as the source address (SA1). Assuming there is no detected failure in the primary tree, the secondary tree is not used, and as such, the second hub edge node 16H2 will not send CCMs to the first hub edge node 16H1, the first spoke edge node 16S1, or the second spoke edge node 16S2. The first hub edge node 16H1 will send spoke traffic toward the first spoke edge node 16S1 and the second spoke edge node 16S2 (steps 206 and 208). The second hub edge node 16H2 will not be providing traffic to the first and second spoke edge nodes 16S1, 16S2.

During this time, the first and second spoke edge nodes 16S1, 16S2 will receive the CCMs from the first hub edge node 16H1 and set the unicast destination address for hub traffic based on the source address (SA1) provided in the CCMs that were received from the first hub edge node 16H1 via the primary tree (steps 210 and 212). Accordingly, the first and second spoke edge nodes 16S1, 16S2 will deliver hub traffic to the first hub edge node 16H1 via the primary tree (steps 214 and 216). The destination address in the Ethernet frames of the hub traffic is set to the address (SA1) associated with the first hub edge node 16H1 and derived from the CCMs received from the first hub edge node 16H1.

At this point, assume there is a failure of hub edge node 16H1 (step 218). When the first hub edge node 16H1 fails, the second hub edge node 16H2 will detect a loss of the CCMs from the first hub edge node 16H2 (step 220) and immediately initiate delivery of CCMs and spoke traffic via the secondary tree (step 222). As such, the second hub edge node 16H2 will deliver CCMs to the first hub edge node 16H1, the first spoke edge node 16S1, and the second spoke edge node 16S2 (steps 224, 226, and 228). The CCMs will have a source address (SA2) corresponding to the second hub edge node 16H2. As illustrated, the second hub edge node 16H2 will send traffic to the first and second spoke edge nodes 16S1, 16S2, respectively, over the secondary tree (steps 230 and 232).

The first and second spoke edge nodes 16S1, 16S2 may detect the failure to receive CCMs via the primary tree, or may detect the receipt of CCMs from the second hub edge node 16H2 via the secondary tree. Upon such detection, the first and second spoke edge nodes 16S1, 16S2 will set the unicast destination address for the hub traffic based on the source address (SA2) provided in the CCMs received from the second hub edge node 16H2 (steps 234 and 236). Accordingly, the first and second spoke edge nodes 16S1, 16S2 will deliver hub traffic to the second hub edge node 16H2, wherein the destination address of the Ethernet frames carrying the hub traffic is set to the address (SA2) associated with the second hub edge node 16H2 (steps 238 and 240). The second hub edge node 16H2 as well as the first and second spoke edge nodes 16S1, 16S2 may switch back to the primary tree once CCMs from the first hub edge node 16H1 reappear on the primary tree.

In a third embodiment of the present invention, once again assume that the secondary tree is only used when the primary tree is associated with a failure. While the previous example was particularly beneficial when one of the first and second hub edge nodes 16H1, 16H2 failed, this embodiment is particularly beneficial when the failure occurs in an intermediate node 18 or a physical link in the primary or secondary trees. As with the previous embodiment, assume that the first hub edge node 16H1 is active and there are no failures detected on the primary tree. In operation, the first hub edge node 16H1 will transmit control messages including the CCMs, as well as traffic over the primary tree, and the first and second spoke edge nodes 16S1, 16S2 transmit their traffic over the primary tree as well. Notably, the first and second spoke edge nodes 16S1, 16S2 will transmit CCMs, preferably in a unicast format, toward the active hub, which is the first hub edge node 16H1.

When a failure occurs, the first hub edge node 16H1 will stop receiving CCMs from one or more of the first and second spoke edge nodes 16S1, 16S2. In response to detecting the loss of CCMs from the first or second spoke edge nodes 16S1, 16S2, the first hub edge node 16H1 will begin transmitting CCMs that include a failure flag. In one embodiment, the failure flag corresponds to setting the Remote Defect Indication (RDI) bit of a CCM. Upon receipt of a CCM that includes the failure flag, the second hub edge node 16H2 will start delivering traffic and CCMs over the secondary tree toward the first and second spoke edge nodes 16S1, 16S2. The first and second spoke edge nodes 16S1, 16S2 will continue to use the primary tree as long as CCMs are received over the primary tree from the (active) first hub edge node 16H1. When CCMs are no longer being received via the primary tree, the first and second spoke edge nodes 16S1, 16S2 will immediately transition to using the secondary tree, wherein traffic and the CCMs are delivered to the second hub edge node 16H2 via the secondary tree. When the failure is corrected, the affected ones of the first hub edge node 16H1, the first spoke edge node 16S1, and the second spoke edge node 16S2 will transition back to the original operating state.

Figure 8B:
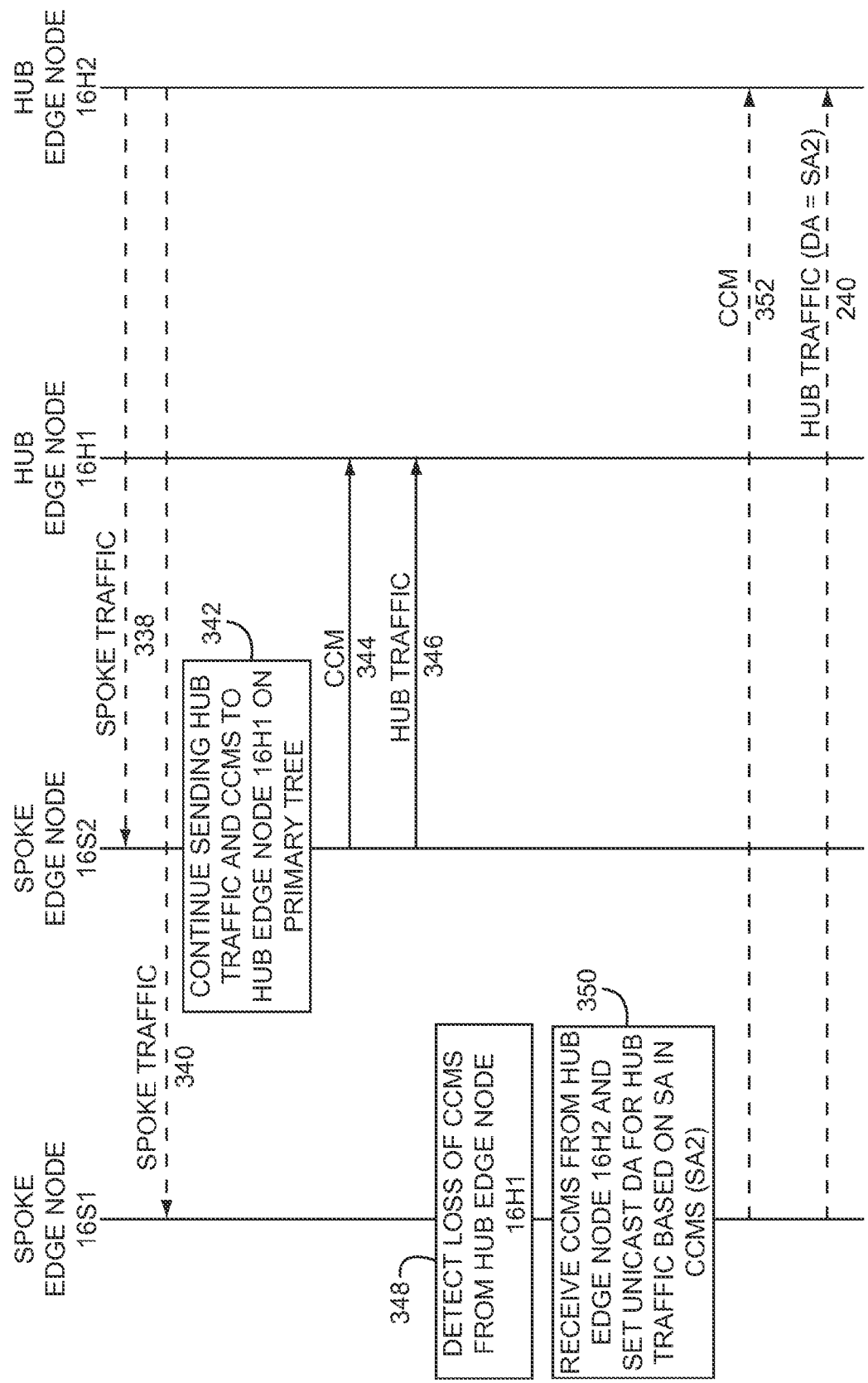

A communication flow illustrating this example is provided in FIGS. 8A and 8B. Initially, assume that the first hub edge node 16H1 is the active node and is delivering CCMs over the primary tree to the second hub edge node 16H2 as well as the first and second spoke edge nodes 16S1, 16S2 (steps 300, 302, and 304). The first hub edge node 16H1 is also delivering spoke traffic over the primary tree to the first and second spoke edge nodes 16S1, 16S2 (steps 306 and 308). While CCMs are being received via the primary tree from the first hub edge node 16H1, the first and second spoke edge nodes 16S1, 16S2 will deliver CCMs to the first hub edge node 16H1 (steps 310 and 312), as well as deliver hub traffic to the first hub edge node 16H1 via the primary tree (steps 314 and 316). Notably, the CCMs are preferably delivered every 10 ms, and the hub traffic will have a destination address corresponding to the source address (SA1) that is provided in the CCMs received from the first hub edge node 16H1 and associated with the first hub edge node 16H1.

At this point, assume a failure occurs that isolates the spoke edge node 16S1 from the hub edge node 16H1 (step 318). As such, the first hub edge node 16H1 will detect the loss of CCMs from the first spoke edge node 16S1 via the primary tree (step 320). The first hub edge node 16H1 will then set a failure flag in the CCMs (step 322) that it is consistently delivering toward the second hub edge node 16H2, the first spoke edge node 16S1, and the second spoke edge node 16S2 (steps 324, 326, and 328). Again, the failure flag may be represented by setting the RDI bit in the CCM message. Notably, the CCMs are only received by the second spoke edge node 16S2 and the second hub edge node 16H2. The CCMs sent toward the first spoke edge node 16S1 are not received.

The second hub edge node 16H2 will detect the failure flag in the CCMs received via the primary tree from the first hub edge node 16H1 (step 330). In response to detecting the failure flag in the CCMs, the second hub edge node 16H2 will begin sending CCMs via the secondary tree to the first hub edge node 16H1, as well as to the first and second spoke edge nodes 16S1, 16S2 (steps 332, 334, and 336). The CCMs will include the address (SA2) associated with the second hub edge node 16H2 as the source address. Further, the second hub edge node 16H2 will initiate delivery of spoke traffic toward the first and second spoke edge nodes 16S1, 16S2 via the secondary tree (steps 338 and 340).

During this time, the second spoke edge node 16S2 will continue receiving CCMs from the first hub edge node 16H1 via the primary tree, and as such, will continue operation as normal. In particular, the second spoke edge node 16S2 will continue sending hub traffic and CCMs to the first hub edge node 16H1 on the primary tree (steps 342, 344, and 346). However, the first spoke edge node 16S1 will detect the loss of CCMs that were being provided by the first hub edge node 16H1 over the primary tree (step 348). Further, the first spoke edge node 16S1 will begin receiving CCMs from the second hub edge node 16H2 and set the unicast destination address for hub traffic based on the source address in the CCMs received via the secondary tree (step 350). In this instance, the source address in the CCMs from the secondary tree (SA2) corresponds to the second hub edge node 16H2. Accordingly, the first spoke edge node 16S1 will begin sending CCMs and hub traffic toward the second hub edge node 16H2 via the secondary tree (steps 352 and 354). Notably, if the second spoke edge node 16S2 is affected by the failure in a similar way as the first spoke edge node 16S1, the second spoke edge node 16S2 may also switch to the secondary tree in a similar fashion. Further, when the failure is resolved, the affected ones of the first and second hub edge nodes 16H1, 16H2 as well as the first and second spoke edge nodes 16S1, 16S2 may revert back to using the primary tree and return to the original operating state.

In yet another embodiment employing redundant E-TREEs, different E-TREEs may be used to share or coordinate loads for different spoke edge nodes 16S1, 16S2. For example, a non-failure state may call for traffic involving the first spoke edge node 16S1 being carried over the primary tree, while traffic associated with the second spoke edge node 16S2 is carried by the secondary tree. The CCMs or other control messages are provided by each of the first and second hub edge nodes 16H1, 16H2 to each of the first and second spoke edge nodes 16S1, 16S2 over the corresponding primary and secondary trees. As such, the first and second spoke edge nodes 16S1, 16S2 receive CCMs from each of the first and second hub edge nodes 16H1, 16H2, over the primary and secondary trees, respectively, even though traffic is only being exchanged over a corresponding one of the primary and secondary trees. Although this example contemplates a distinct allocation of traffic for different spoke edge nodes 16S1, 16S2 to different ones of the primary and secondary trees, the traffic may be shared in various ways based on traffic type, quality of service, or the like, wherein certain traffic is associated with the primary tree and other traffic is associated with the secondary tree for a given spoke edge node 16S1, 16S2. The spoke edge nodes 16S1, 16S2 will again use the source address provided in the CCMs received over the allocated tree, unless a failure occurs. The spoke edge nodes 16S1, 16S2 will respectively send CCMs toward the associated one of the first and second hub edge nodes 16H1, 16H2. The first and second spoke edge nodes 16S1, 16S2, in this embodiment, do not send CCMs over both the primary and secondary trees.

Upon a failure in receiving CCMs from an active one of the first and second hub edge nodes 16H1, 16H2, the corresponding first and second spoke edge nodes 16S1, 16S2 will switch to the other one of the first and second hub edge nodes 16H1, 16H2 and begin transmitting CCMs toward the newly selected hub edge node 16H1 or 16H2. Upon failing to receive CCMs from the corresponding spoke edge node 16S1 or 16S2, the associated hub edge node 16H1 or 16H2 will stop serving the associated spoke edge node 16S1 or 16S2. When a hub edge node 16H1 or 16H2 begins receiving CCMs from a spoke edge node 16S1, 16S2 that it was not previously serving, it will begin serving that spoke edge node 16S1, 16S2.

Figure 9A:
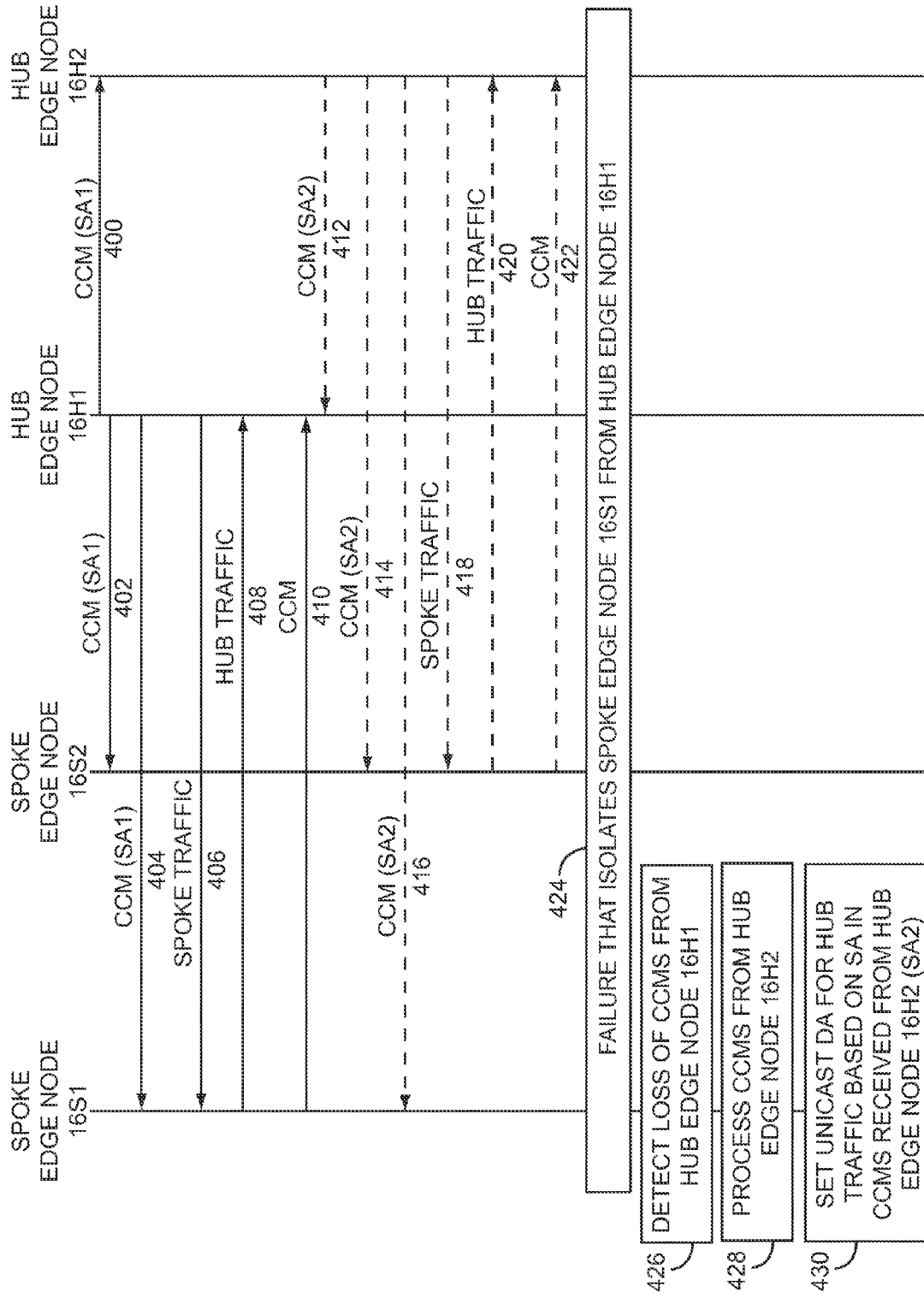
FIGS. 9A and 9B are a communication flow illustrating a fourth embodiment of the present invention.
Figure 9B:
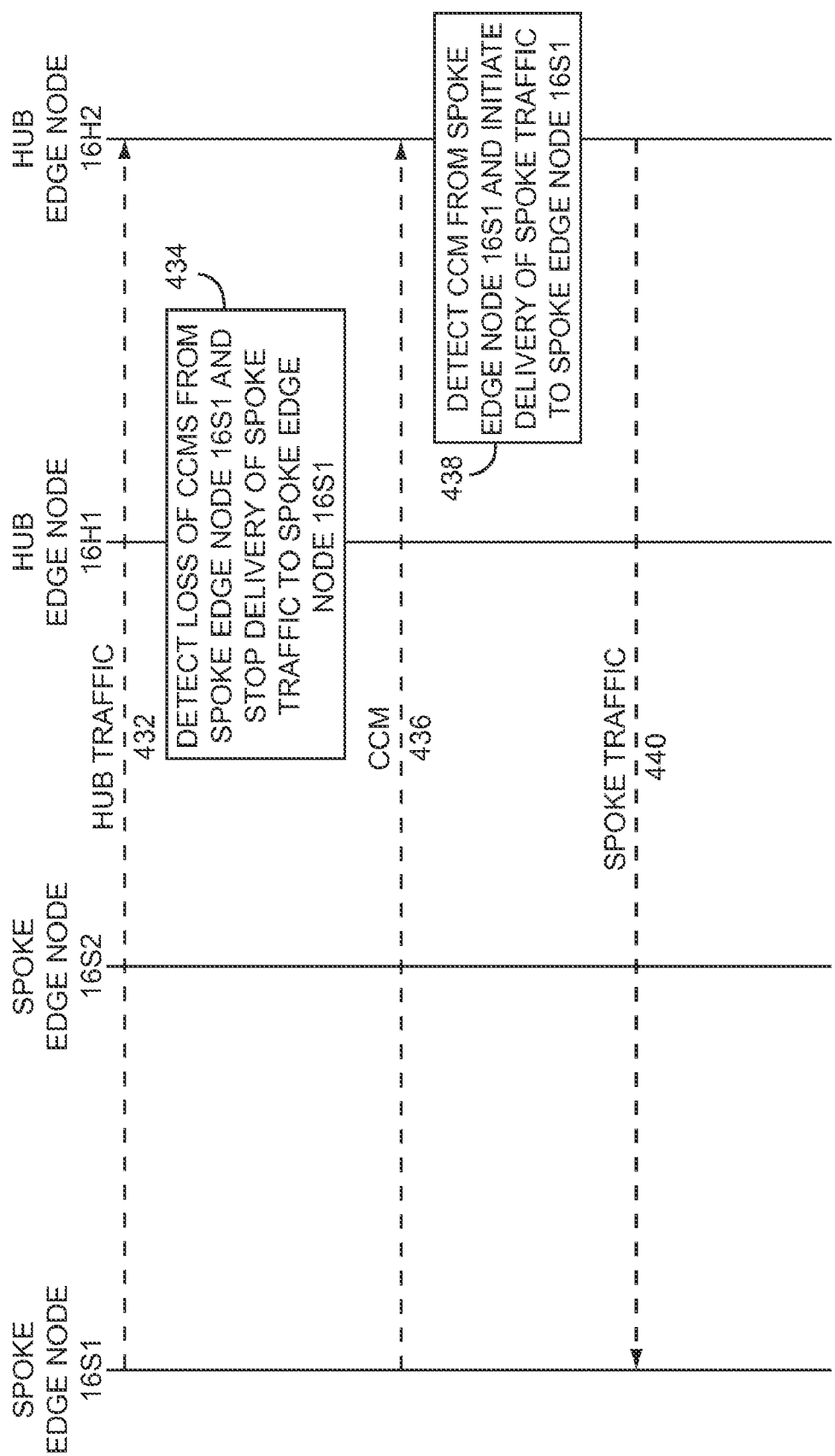

A communication flow illustrating this embodiment is provided in FIGS. 9A and 9B. Initially, assume that first hub edge node 16H1 is assigned to spoke edge node 16S1, and traffic is provided over the primary tree. Further assume that second hub edge node 16H2 is assigned to spoke edge node 16S2, and traffic is provided over the secondary tree. As such, the first hub edge node 16H1 will begin sending CCMs via the primary tree to the second hub edge node 16H2 as well as the first and second spoke edge nodes 16S1, 16S2 (steps 400, 402, and 404). The CCMs provided by the first hub edge node 16H1 will include a source address (SA1) that is associated with the first hub edge node 16H1. The first hub edge node 16H1 is also providing spoke traffic for the first spoke edge node 16S1 to the first spoke edge node 16S1 (step 406). In response to receiving the CCMs via the primary tree, the first spoke edge node 16S1 will provide hub traffic and CCMs toward the first hub edge node 16H1 (steps 408 and 410).

Concurrently, the second hub edge node 16H2 is sending CCMs via the secondary tree to the first hub edge node 16H1 as well as the first and second spoke edge nodes 16S1, 16S2 (steps 412, 414, and 416). The CCMs provided by the second hub edge node 16H2 will include a source address (SA2) that is associated with the second hub edge node 16H2. The second hub edge node 16H2 will deliver spoke traffic for the second spoke edge node 16S2 via the secondary tree (step 418). Assuming there is no failure in the secondary tree, the second spoke edge node 16S2 will deliver hub traffic and CCMs via the secondary tree toward the second hub edge node 16H2 (steps 420 and 422). The hub traffic is directed to the address associated with the second hub edge node 16H2 and provided in the CCMs received from the second hub edge node 16H2.

Next, assume that a failure occurs that isolates the first spoke edge node 16S1 from the first hub edge node 16H1 (step 424). As such, the traffic being exchanged between the first spoke edge node 16S1 and the first hub edge node 16H1 via the primary tree is affected. The first spoke edge node 16S1 will detect the loss of CCMs from the first hub edge node 16H1 via the primary tree (step 426), and will begin processing the CCMs being received from the second hub edge node 16H2 via the secondary tree (step 428). In response, the first spoke edge node 16S1 will set the unicast destination address for the hub traffic based on the source address (SA2) in the CCMs being received from the second hub edge node 16H2 over the secondary tree (step 430). As such, the first spoke edge node 16S1 switches from sending hub traffic to the first hub edge node 16H1 via the primary tree to sending hub traffic to the second hub edge node 16H2 via the secondary tree using the address associated with the second hub edge node 16H2 (step 432).

As a result of the failure, the first hub edge node 16H1 will also detect a loss of CCMs being provided by the first spoke edge node 16S1 via the primary tree, and will stop delivery of spoke traffic toward the spoke edge node 16S1 (step 434). Meanwhile, the first spoke edge node 16S1 will switch from sending CCMs to the first hub edge node 16H1 via the primary tree to sending CCMs to the second hub edge node 16H2 via the secondary tree (step 436). Upon detecting the CCMs of the first spoke edge node 16S1 via the secondary tree, the second hub edge node 16H2 will initiate delivery of spoke traffic that is intended for the first spoke edge node 16S1 to the spoke edge node 16S1 via the secondary tree (steps 438 and 440). As such, the second hub edge node 16H2 will begin receiving and delivering traffic associated with the first spoke edge node 16S1 when the first hub edge node 16H1 is no longer capable of doing so due to a failure. As with the other embodiments, when the failure condition is resolved, normal operation may be resumed. Assuming that the CCMs are delivered at a rate higher than one every 10 ms, switches from a primary tree to a secondary tree may take place in less than 50 ms, and therefore, prevent unacceptable interruptions in service.

Figure 10:
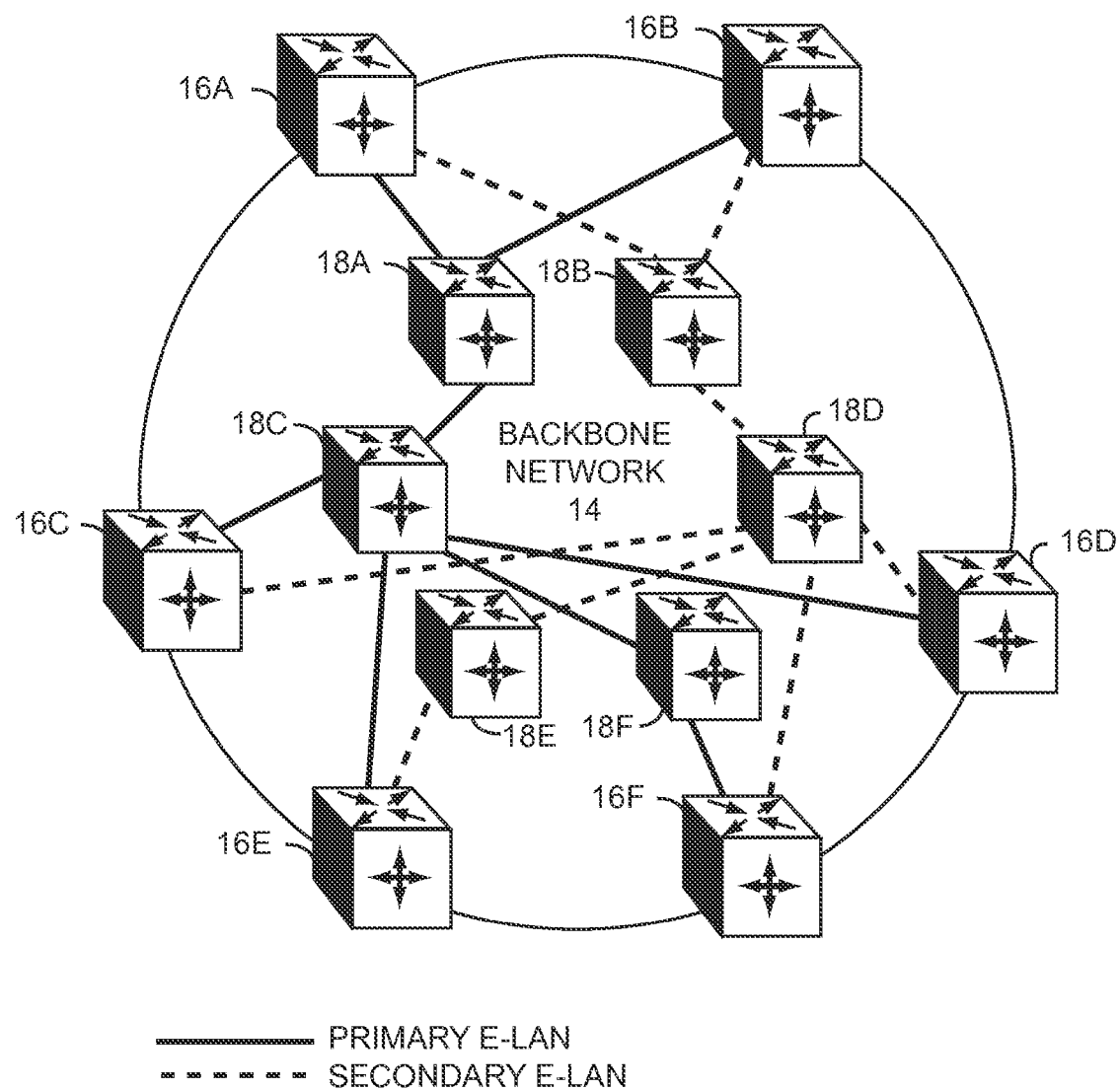
FIG. 10 illustrates a multi-point architecture for a backbone network according to one embodiment of the present invention.

While the prior examples related to the use of primary and secondary trees, such as E-TREEs, certain concepts of the present invention are applicable to E-LAN configurations as well. With reference to FIG. 10, an exemplary E-LAN configuration is depicted. As stated above, an E-LAN configuration is a multi-point configuration wherein any edge node 16A-16F is capable of communicating with any other edge node 16A-16F. The multi-point architecture is not rooted at any particular hubs, and each edge node 16A-16F may be an equivalent node and be used to support different sources, such as edge networks 12. As illustrated, each of the edge nodes 16A-16F is connected through a primary E-LAN, which is illustrated by a thick solid line, as well as a secondary E-LAN, which is illustrated by a thick dashed line. A failure in one E-LAN will preferably not affect the other E-LAN, and as such, operation in a primary E-LAN may be switched to a secondary E-LAN upon detecting a failure in the primary E-LAN. As depicted, intermediate nodes 18A, 18C, and 18F are interconnected and facilitate connections to each of the edge nodes 16A-16F to form the primary E-LAN. Similarly, intermediate nodes 18B, 18D, and 18E are interconnected and facilitate connections to each of the edge nodes 16A-16F to provide the secondary E-LAN. Again, the primary and secondary E-LANs are considered separate EVCs, and as such Ethernet frames may be tagged to facilitate transport over a particular E-LAN. The E-LANs may be dynamically or statically provisioned in the same fashion as described above.

Preferably, the primary and secondary E-LANs are substantially independent from one another, such that a failure on one does not affect the other, and shared risk link groups are avoided. Although the avoidance of shared risk link groups is preferred, it is not necessary in the E-LAN or E-TREE examples.

In one embodiment, each of the edge nodes 16A-16D are providing CCMs to other ones of the edge nodes 16A-16D on both the primary and secondary E-LANs. When a nodal or link failure occurs, one or more edge nodes 16A-16F will detect a loss of CCMs from other edge nodes 16A-16F. The edge node 16A-16F that detects a loss of CCMs may set a failure flag in its CCMs and deliver the CCMs to the other edge nodes 16A-16F. Upon receiving a CCM with a failure flag, an edge node 16A-16F will transition from the primary E-LAN to the secondary E-LAN for transmitting and receiving traffic. Those edge nodes 16A-16F that detect a failure, such as a loss of CCMs from any of the edge nodes 16A-16F over the primary E-LAN, will also switch to the secondary E-LAN for delivering and receiving traffic. As such, the edge nodes 16A-16F will switch to the secondary E-LAN after detecting the failure condition through different means, and importantly, all of the edge nodes 16A-16F will ultimately transition from the primary E-LAN to the secondary E-LAN, permanently or until the failure condition is resolved.

Figure 11A:
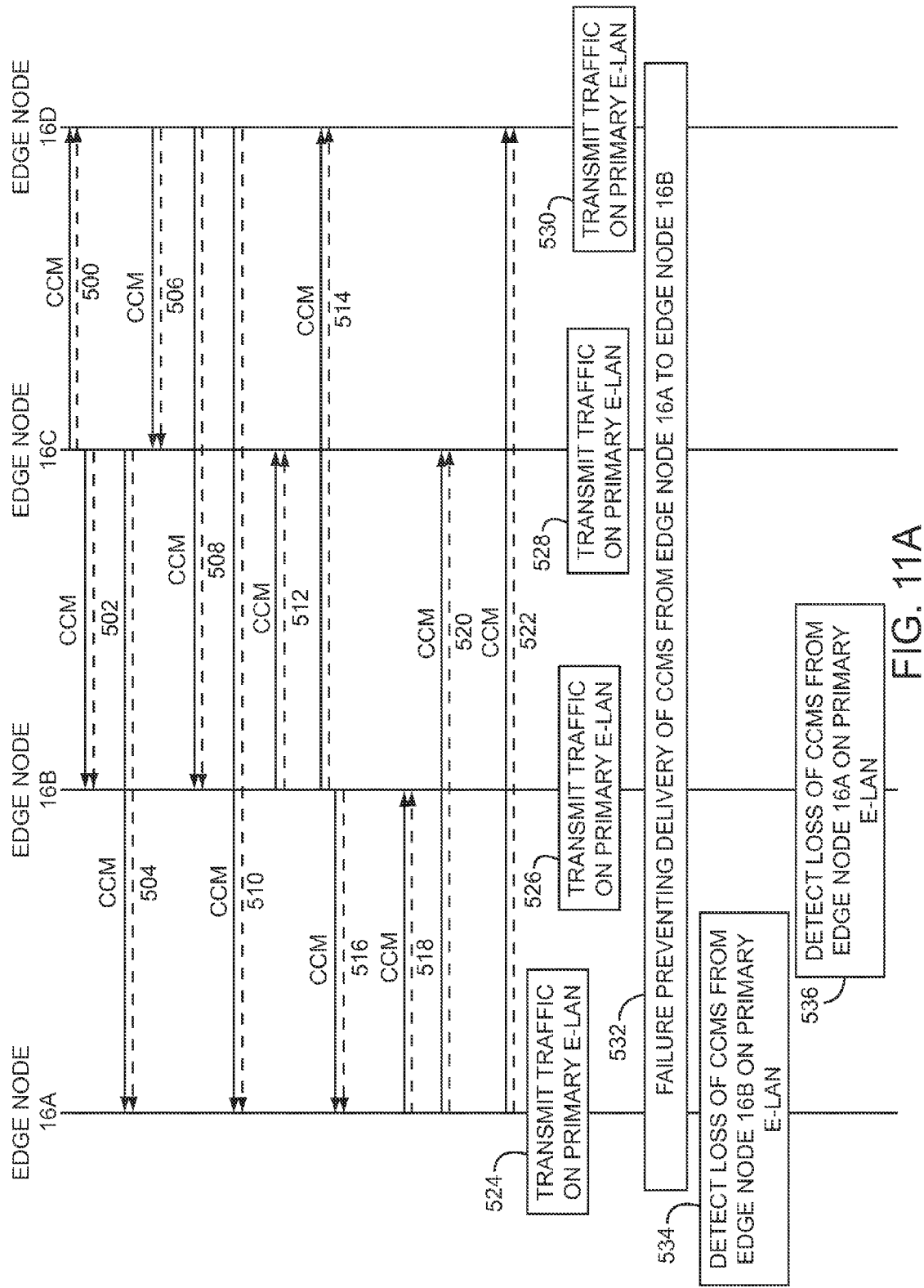
FIGS. 11A and 11B are a communication flow illustrating a fifth embodiment of the present invention.
Figure 11B:
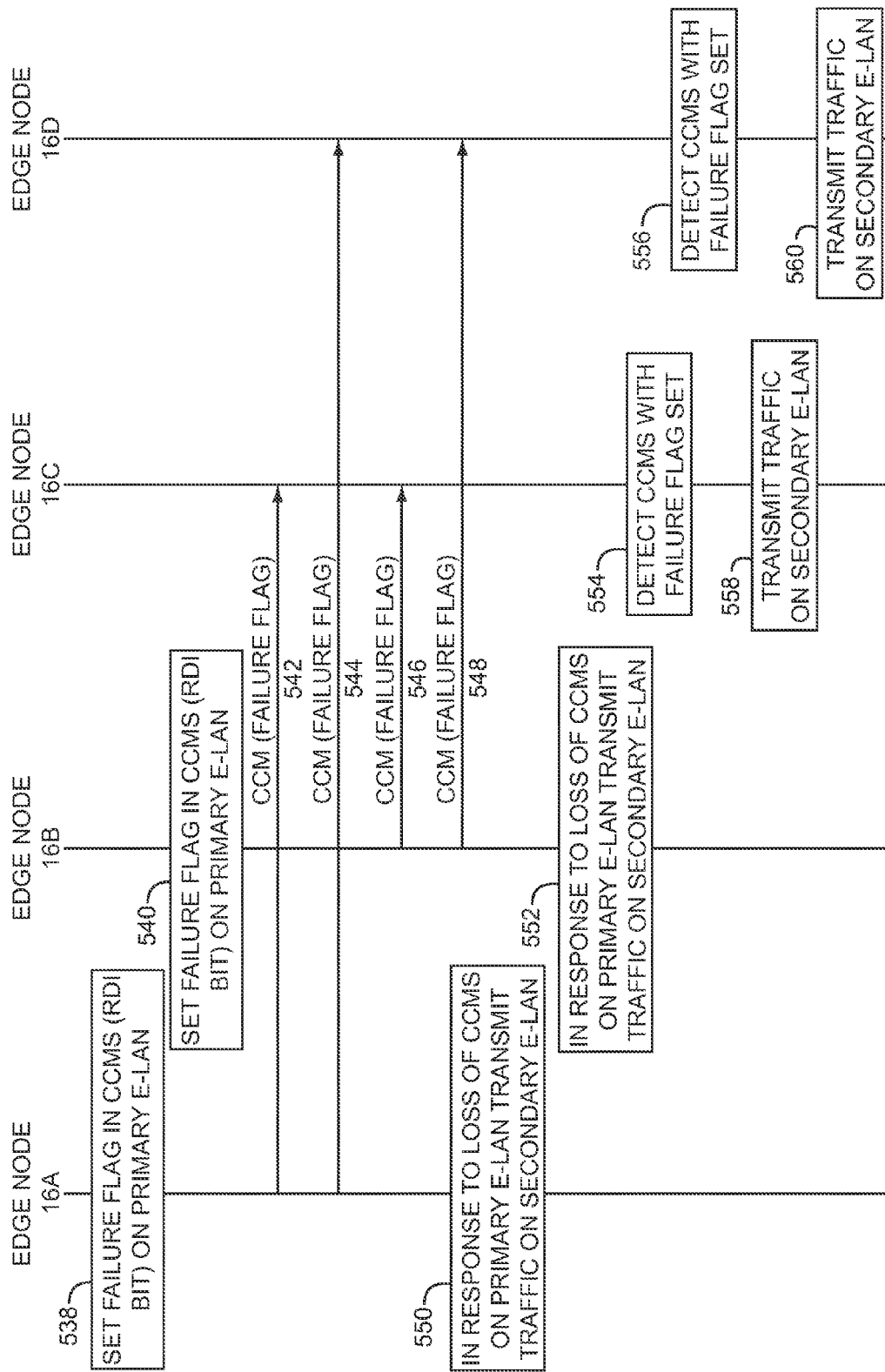

A communication flow illustrating the above embodiment is provided in FIGS. 11A and 11B. Initially, assume that each of the edge nodes 16A-16D are providing CCMs to other ones of the edge nodes 16A-16D on both the primary and secondary E-LANs. As such, edge node 16C will send CCMs to the edge nodes 16D, 16B, and 16A via the primary and secondary E-LANs (steps 500, 502, and 504). Edge node 16D will send CCMs to edge nodes 16C, 16B, and 16A via the primary and secondary E-LANs (steps 506, 508, and 510). Edge node 16B will send CCMs to edge nodes 16C, 16D, and 16A via the primary and secondary E-LANs (steps 512, 514, and 516). Edge node 16A will send CCMs to edge nodes 16B, 16C, and 16D via the primary and secondary E-LANs (steps 518, 520, and 522). Only four edge nodes 16A-16D are provided in the communication flow for conciseness and clarity. In addition to providing the CCMs on both the primary and secondary E-LANs, each of the edge nodes 16A-16D will transmit traffic only on the primary E-LAN (steps 524, 526, 528, and 530).

At this point, assume there is a failure that prevents the delivery of CCMs from the edge node 16A to the edge node 16B, and vice versa (step 532). As a result, edge node 16A will detect a loss of CCMs from edge node 16B on the primary E-LAN (step 534). Similarly, edge node 16B will detect a loss of CCMs from edge node 16A on the primary E-LAN (step 536). Both edge nodes 16A and 16B will set a failure flag in the CCMs being provided on the primary E-LAN (step 538 and 540) and will transmit the CCMs toward the other edge nodes 16A-16D. Due to the failure, the CCMs will not be received by the edge nodes 16A and 16B, but the CCMs may be received by the edge nodes 16C and 16D (steps 542, 544, 546, and 548). Concurrently, the edge nodes 16A and 16B will also begin transmitting traffic on the secondary E-LAN (steps 550 and 552). At this point, the edge nodes 16A and 16B are sending CCMs with the failure flag via the primary E-LAN and transmitting traffic, and perhaps regular CCMs, on the secondary E-LAN.

Edge nodes 16C and 16D will detect the CCMs with the failure flag received from edge nodes 16A and 16B (steps 554 and 556). In response to receiving a CCM with a failure flag, edge nodes 16C and 16D will begin transmitting traffic, and perhaps regular CCMs, on the secondary E-LAN (steps 558 and 560). As such, edge nodes 16A and 16B will rapidly detect a failure and switch from one E-LAN to another for delivering traffic, as well as regular CCMs, while avoiding excessive and supplementary control messaging to detect the failure and facilitate a transition from one E-LAN to another.

Figure 12:
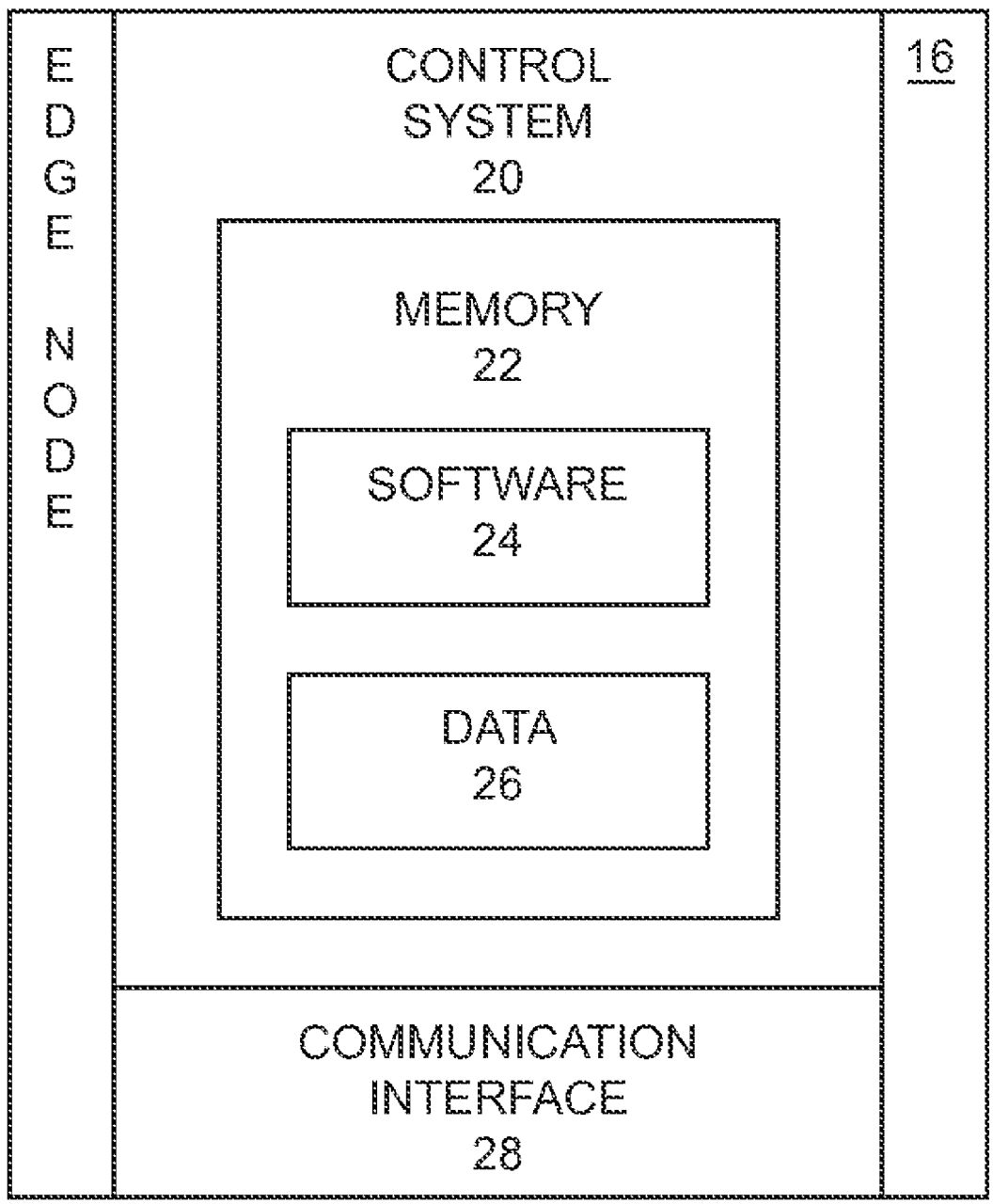
FIG. 12 is a block diagram of an edge node according to one embodiment of the present invention.

Turning now to FIG. 12, a block representation of an edge node 16 is provided according to one embodiment of the present invention. The edge node 16 may include a control system 20 with sufficient memory 22 for the requisite software 24 and data 26 to operate as described above. The control system 20 may be associated with at least one communication interface 28 to facilitate communications over the backbone network 14 as well as associated edge networks 12, which may facilitate Ethernet or other transport mechanisms.

Although the above embodiments are focused on Carrier Ethernet implementations, the present invention is applicable to various transport technologies that use multi-point or rooted multi-point topologies, which are analogous to E-TREE and E-LAN topologies in a Carrier Ethernet architecture.

Those skilled in the art will recognize improvements and modifications to the preferred embodiments of the present invention. All such improvements and modifications are considered within the scope of the concepts disclosed herein and the claims that follow.

What is claimed is:

1. A method for operating a first edge node of a plurality of edge nodes in a backbone network that serves a plurality of edge networks, the first edge node associated with a first virtual network and a second virtual network that are supported by the backbone network, the method comprising:
   supporting traffic over the first virtual network;
   receiving a series of control messages over at least one of the first virtual network and the second virtual network;
   detecting a failure associated with the first virtual network; and
   supporting the traffic over the second virtual network in response to the detecting the failure associated with the first virtual network,
   wherein the series of control messages comprises a first series of control messages received over the first virtual network from a first source prior to the failure and a second series of control messages received over the second virtual network from a second source after the failure, and
   wherein the first series of control messages received over the first virtual network comprises a source address that is associated with the first source that is different than a source address for the second series of control messages received from the second source, such that the traffic sent over the first virtual network prior to the detecting the failure is addressed to the first source and the traffic sent over the second virtual network after the detecting the failure is addressed to the second source.

2. The method of claim 1 wherein the backbone network is a Carrier Ethernet-based network and the first virtual network and the second virtual network are Ethernet Virtual Connections of the Carrier Ethernet-based network.

3. The method of claim 1 wherein detecting the failure comprises detecting that the first series of control messages are no longer being received over the first virtual network.

4. The method of claim 3 further comprising receiving the second series of control messages over the second virtual network while the first series of control messages over the first virtual network are being received.

5. The method of claim 1 wherein detecting the failure comprises detecting the second series of control messages being received over the second virtual network.

6. The method of claim 5 wherein the second series of control messages being received over the second virtual network are only provided in association with a failure in the first virtual network.

7. The method of claim 1 wherein a series of control messages are sent toward the first edge node over the first virtual network and the control messages of the series of control messages will include a failure indicator to identify the failure associated with the first virtual network, and further comprising receiving the series of control messages over the first virtual network before the failure is detected and wherein detecting the failure comprises detecting that the control messages of the series of control messages include the failure indicator.

8. The method of claim 1 wherein supporting the traffic over the first virtual network comprises receiving the traffic from or sending the traffic to one or more of the plurality of edge nodes, and supporting the traffic over the first virtual network comprises receiving the traffic from or sending the traffic to the one or more of the plurality of edge nodes.

9. The method of claim 1 wherein the traffic supported over the first virtual network is exchanged with a second edge node of the plurality of edge nodes and the traffic supported over the second virtual network is exchanged with a third edge node of the plurality of edge nodes.

10. The method of claim 9 wherein the first edge node is a spoke edge node and the second edge node and the third edge node are hub edge nodes in a rooted multi-point architecture, and further comprising operating as a spoke in the multi-point architecture.

11. The method of claim 10 wherein the first virtual network and the second virtual network represent separate E-TREE configured virtual Ethernet connections of a Carrier Ethernet-based network.

12. The method of claim 1 wherein each of the plurality of edge nodes is an edge node in a multi-point architecture and further comprising operating as an edge node in a multi-point architecture.

13. The method of claim 10 wherein the first virtual network and the second virtual network represent separate E-LAN configured virtual Ethernet connections of a Carrier Ethernet-based network.

14. The method of claim 1 wherein the control messages of the series of control messages from the source are normally received at a rate substantially higher than one every 50 milliseconds.

15. The method of claim 1 wherein the control messages of the series of control messages from the source are normally received at a rate of one every 10 milliseconds.

16. The method of claim 1 further comprising sending control messages to the at least one of the plurality of edge nodes at a rate substantially higher than one every 50 milliseconds.

17. The method of claim 1 further comprising:
   sending a series of control messages to at least one of the plurality of edge nodes over the first virtual network, and upon the detecting the failure associated with the first virtual network, providing a failure indicator in control messages of the series of control messages.

18. The method of claim 1 wherein the first virtual network and the second virtual network are configured as to not share intermediate nodes, such that no intermediate node of either of the first virtual network and second virtual network are part of a shared risk link group.

19. A method for operating a first hub edge node that is associated with a second hub edge node in a backbone network wherein the first hub edge node is connected to a plurality of spoke edge nodes via a first virtual network and the second hub edge node is connected to the plurality of spoke edge nodes via a second virtual network, the method comprising:

while the second hub edge node is supposed to be transmitting traffic to at least one of the plurality of spoke edge nodes over the second virtual network, detecting a failure associated with the second virtual network; and upon detecting the failure associated with the second virtual network, commencing delivery of the traffic to the at least one of the plurality of spoke edge nodes over the first virtual network- and commencing delivery of a series of control messages to each of the plurality of spoke edge nodes over the first virtual network upon detecting the failure associated with the second virtual network, wherein control messages are not provided over the first virtual network by the first hub edge node when no failures are associated with the second virtual network.

20. The method of claim 19 further comprising delivering of a series of control messages to each of the plurality of spoke edge nodes over the second virtual network before and after detecting the failure associated with the second virtual network.

21. The method of claim 19 further comprising receiving a series of control messages from the second hub edge node over the second virtual network and wherein:

a failure indicator is provided in certain control messages of the series of control messages when the second hub edge node has detected the failure associated with the second virtual network; and detecting the failure associated with the second virtual network comprises detecting when the failure indicator is provided in the certain control messages of the series of control messages.

22. The method of claim 19 further comprising receiving a series of control messages from the second hub edge node over the second virtual network prior to detecting the failure associated with the second virtual network, and wherein detecting the failure associated with the second virtual network comprises detecting that control messages of the series of control messages are no longer being received from the second hub edge node over the second virtual network.

23. The method of claim 19 further comprising receiving a series of control messages from the at least one of the plurality of spoke edge nodes over the first virtual network, and wherein detecting the failure associated with the second virtual network comprises detecting that the series of control messages from the at least one of the plurality of spoke edge nodes are being received over the first virtual network.

24. The method of claim 23 wherein the series of control messages from the at least one of the plurality of spoke edge nodes are provided in response to the at least one of the plurality of spoke edge nodes detecting the failure associated with second virtual network.

25. The method of claim 19 wherein the backbone network is a Carrier Ethernet-based network and the first virtual network and the second virtual network are Ethernet Virtual Connections of the Carrier Ethernet-based network.

26. The method of claim 19 wherein the first virtual network and the second virtual network represent separate E-TREE configured virtual Ethernet connections of a Carrier Ethernet network.

27. The method of claim 19 wherein the first virtual network and the second virtual network represent separate E-LAN configured virtual Ethernet connections of a Carrier Ethernet network.

* * * * *